US008503742B2

(12) United States Patent
Dewaele et al.

(10) Patent No.: US 8,503,742 B2
(45) Date of Patent: Aug. 6, 2013

(54) METHOD FOR MASS CANDIDATE DETECTION AND SEGMENTATION IN DIGITAL MAMMOGRAMS

(75) Inventors: Piet Dewaele, Sint-Niklaas (BE); Samar Mohamed, Waterloo (CA); Gert Behiels, Edegem (BE)

(73) Assignee: Agfa HealthCare NV, Mortsel (BE)

( * ) Notice: Subject to any disclaimer, the term of this patent is extended or adjusted under 35 U.S.C. 154(b) by 795 days.

(21) Appl. No.: 12/436,536

(22) Filed: May 6, 2009

(65) Prior Publication Data

US 2010/0046814 A1    Feb. 25, 2010

Related U.S. Application Data

(60) Provisional application No. 61/051,815, filed on May 9, 2009.

(30) Foreign Application Priority Data

May 8, 2008  (EP) .................................... 08103868

(51) Int. Cl.
*G06K 9/18* (2006.01)
(52) U.S. Cl.
USPC ............................ 382/128; 382/132; 382/289
(58) Field of Classification Search
USPC ......................................... 382/128, 132, 289
See application file for complete search history.

(56) References Cited

U.S. PATENT DOCUMENTS

| 5,825,936 A * | 10/1998 | Clarke et al. ................ 382/261 |
| 2004/0161141 A1 * | 8/2004 | Dewaele ...................... 382/132 |
| 2004/0213447 A1 * | 10/2004 | Roehrig et al. ............... 382/132 |
| 2006/0110068 A1 * | 5/2006 | Luo et al. ...................... 382/289 |
| 2006/0177125 A1 * | 8/2006 | Chan et al. .................... 382/154 |
| 2008/0285825 A1 * | 11/2008 | Zhang et al. .................. 382/128 |
| 2010/0104148 A1 * | 4/2010 | Bovik et al. .................. 382/128 |
| 2011/0222752 A1 * | 9/2011 | Zhang et al. .................. 382/132 |

FOREIGN PATENT DOCUMENTS

| WO | 99/28853 A1 | 6/1999 |
| WO | 02/15113 A2 | 2/2002 |

OTHER PUBLICATIONS

Bhangale, Tushar, et al., "An Unsupervised Scheme for Detection of Microcalcifications on Mammograms," Image Processing, 2000. Proceedings. 2000 International Conference on Sep. 10-13, 2000, Piscataway, NJ, USA, IEEE, vol. 1, Sep. 10, 2000, pp. 184-187.

(Continued)

*Primary Examiner* — Joseph Chang
*Assistant Examiner* — Jeffrey Shin
(74) *Attorney, Agent, or Firm* — Houston & Associates, LLP

(57) ABSTRACT

A basic component of Computer-Aided Detection systems for digital mammography comprises generating candidate mass locations suitable for further analysis. A component is described that relies on filtering either the background image or the complementary foreground mammographic detail by a purely signal processing method on the one hand or a processing method based on a physical model on the other hand. The different steps of the signal processing approach consist of band-pass filtering the image by one or more band pass filters, multidimensional clustering, iso-contouring of the distance to centroid of the one or more filtered values, and finally candidate generation and segmentation by contour processing. The physics-based approach also filters the image to retrieve a fat-corrected image to model the background of the breast, and the resulting image is subjected to a blob detection filter to model the intensity bumps on the foreground component of the breast that are associated with mass candidates.

20 Claims, 27 Drawing Sheets

(56) References Cited

OTHER PUBLICATIONS

Cheng, H.D., et al., "Computer-aided Detection and Classification of Microcalcifications in Mammograms: a Survey," Pattern Recognition, Elsevier, GB, vol. 36, No. 12, Dec. 1, 2003, pp. 2967-2991.

Kom, Guillaume, et al., "Automated Detection of Masses in Mammograms by Local Adaptive Thresholding," Computers in Biology and Medicine, New York, NY, USA, vol. 37, No. 1, Oct. 20, 2006, pp. 37-48.

Strickland, Robin N., et al., "Wavelet Transforms for Detecting Microcalcifications in Mammograms," IEEE Transactions on Medical Imaging, IEEE Service Center, Piscataway, NJ, USA, vol. 15, No. 2, Apr. 1, 1996, pp. 218-229.

Wang, Ted C., et al., "Detection of Microcalcifications in Digital Mammograms Using Wavelets," IEEE Transactions on Medical Imaging, IEEE Service Center, Piscataway, NJ, US, vol. 17, No. 4, Aug. 1, 1998.

European Search Report dated Oct. 20, 2008, from counterpart European Application No. EP 08 10 3868, filed on May 8, 2008.

\* cited by examiner (a)

(b)

(a)

(b)

(a)

(b)

a  b c  d a b c d (a)

(b)

(c)

METHOD FOR MASS CANDIDATE DETECTION AND SEGMENTATION IN DIGITAL MAMMOGRAMS

RELATED APPLICATIONS

This application claims priority to European Patent Application No. EP 08103868.9, filed on May 8, 2008, and claims the benefit under 35 USC 119(e) of U.S. Provisional Application No. 61/051,815, filed on May 9, 2008, both of which are incorporated herein by reference in their entirety.

BACKGROUND OF THE INVENTION

The anatomy of the female breast changes over age. During the reproductive years, the breast consists mainly of ductal, glandular, and fat tissue. This is interspersed with fibrous tissue providing support and attachment to the chest wall. Glandular and fibrous tissues are jointly called the fibroglandular tissue. The breast glandular tissue is called the breast parenchyma and consists of 20 . . . 25 lobules (glands), responsible for milk production and are drained towards the nipple by numerous tiny tubes (ducts) that come together to form bigger ducts. Each milk-producing lobule contains a cluster or ring of cells. The sections of lobules and ducts are surrounded by fat for protection, and supported by the fibrous tissue. With age, ductal and glandular elements undergo atrophic changes and are increasingly replaced by fatty tissue. The breasts are held in place by ligaments that attach the breast tissue to the muscles of the chest. Breasts are covered by ordinary skin everywhere except the nipple and the aureoles around it.

The fibrous, ductal and glandular tissues appear as dark or "dense" on the X-ray mammogram. Fat, on the other hand, has a transparent, or lucent, appearance. The terms mammographic density (MD) and mammographic pattern are widely used to describe the proportion of dense/lucent areas in the breast presented on the mammogram. In the past, different methods of classification of mammographic parenchymal patterns have been proposed such as the Nottingham classification (5 patterns such as Normal (N), Glandular (G2, G1, G0), Dysplasia (DS-slight, DM-moderate, DY severe), prominent ducts (P1, P2) and indeterminate (IND)), Wolfe classification (4 categories) and Tabar-Dean classification (5 patterns).

Two major categories of breast cancer are lobular and ductal carcinoma.

Lobular carcinoma in situ (LCIS) is a condition of sharp increase of the number, appearance, and abnormal behaviour of cells contained in the milk-producing lobules of the breast. The term "in situ" refers to an early stage of cancer and is used to indicate that abnormal cancer cells are present but have not spread past the boundaries of tissues where they initially developed. Though LCIS is not considered a cancer, women who are diagnosed with LCIS (also called lobular neoplasia) are at a higher risk of developing breast cancer later in life.

Ductal carcinoma in situ (DCIS) is the most common condition of early cancer development in the breast. Again "in situ" describes a cancer that has not moved out of the area of the body where it originally developed. With DCIS, the cancer cells are confined to milk ducts in the breast and have not spread into the fatty breast tissue or to any other part of the body (such as the lymph nodes). DCIS may appear on a mammogram as tiny specks of calcium (called micro-calcifications).

Both LCIS and DCIS may develop into invasive cancers (infiltrating lobular carcinoma or infiltrating ductal carcinoma) where cancer spreads into the fatty breast tissue or to any other part of the body (such as the lymph nodes), called metastases.

Mammography has become by far the most used and the most successful tool in the detection of early symptoms of breast cancer, which can often be signalled by the presence of micro-calcifications or masses. However, visual analysis—as performed by radiologists—remains a very complex task and many Computer-Aided Detection/Diagnosis (CAD) systems have been developed that support their detection and classification. Indeed, the impact of a computer aided detection (CAD) system on the detection efficiency of an experienced and respectively non-experienced radiologist has been investigated e.g. in C. Balleyguier, K. Kinkel, J. Fermanian, S. Malan, G. Djen, P. Taourel, O. Helenon, Computer-aided detection (cad) in mammography: Does it help the junior or the senior radiologist?, European Journal of Radiology 54 (2005) (2005) 90-96. In both cases the CAD system has proven an effective support tool for the detection, though, its autonomy remains in doubt. Therefore, due to the complexity of the problem, automatic or semi-automatic systems still play only the role of a signalling tool for the radiologist.

In the CAD environment, one of the roles of image processing would be to detect the Regions of Interest (ROI) that need further processing for a given screening or diagnostic application. Once the ROIs have been detected, the subsequent tasks would relate to the characterization of the regions and their classification into one of several categories.

Examples of ROIs in mammograms are (a) calcifications, (b) tumours and masses, (c) the pectoral muscle, (d) the breast outline or skin-air boundary. Segmentation is the process that divides the image into its constituent parts, objects or ROIs. Segmentation is an essential step before the detection, description, recognition or classification of an image or its constituent parts, e.g. mammographic lesions, can take place.

A radiation image such as a mammogram typically consists of three main areas:

The diagnostic area comprises pixels corresponding to patient anatomy e.g. the breast. In general, the outline of this imaged area may take any shape.

The direct exposure area is the image region that has received un-attenuated radiation. Although this region has constant intensity corrupted by noise only, inhomogenities in incident energy (e.g. X-ray source Heel effect) and receptor (e.g. varying storage phosphor sensitivity in computed radiography) may distort this pattern. In European patent application 1 256 907 a method is disclosed to estimate these global inhomogenities retrospectively from the diagnostic image and flatten the response in all image parts in accordance with an extrapolated background signal.

The collimated areas—if any—appear on the image as highly attenuated pixels. The shape of these areas typically is rectilinear, but circular or curved collimation shapes may be applied as well.

Between these main areas in a radiation image, three different area transition types may be considered: diagnostic/direct exposure, diagnostic/collimated area, and direct exposure/collimated area boundaries.

Segmentation algorithms aim at detecting and separating of the set of pixels that constitute the object(s) under analysis. These techniques may be broadly classified according to the type of processing applied to the image. Region-based algorithms group pixels in the image according to suitable similarity criteria. In European patent application EP 887 769 a region-based algorithm is disclosed to segment direct exposure areas by grouping pixels according to centroid clustering of the grey value histogram. Edge-based algorithms separate image pixels in high contrast regions in the image according to grey value differences of neighboring regions. In European patent application 610 605 and European patent application 742 536 an edge-based algorithm is disclosed to detect and delineate the boundaries between collimated areas and diagnostic areas on a single or multiply exposed image. Either in region-based and edge-based approaches, models may be used to restrict the appearance or shape of the segmented image areas to obey predefined photometric or geometric constraints. Examples of this paradigm are the so-called Active Appearance and Active Shape Models (AAM and ASM).

Because an analysis of the inner breast region is aimed at, neither of these techniques are applicable as (a) they are overall segmentation techniques not adapted to the specific content of breast structures and lesions and only yielding major entities such as the breast outline, or (b) assume specific geometric or photometric constraints that are not applicable to the large variability of mammographic appearance of breast structures and lesions. Therefore, in the current patent application, the focus goes to techniques that reliably segment the structures and densities inside the breast skin outline. In particular, a method to detect and segment candidate mammographic masses is described.

The detection step, relying on the segmentation step is generally considered to be a very complex task. For example, masses are groups of cells clustered together more densely than the surrounding tissue and can be represented on a mammogram by a relatively small intensity change. Furthermore, a mammographic scan records all the structures present in a breast, the structures of which vary in size, homogeneity, position and medical significance. Finally, digital mammography, by its very nature, is inherently characterised by the error introduced as a result of the conversion between real-world and the digital representation, i.e., the quantisation noise. All these three factors increase the complexity of the task of breast cancer diagnosis.

In EP 6122899 A1, a segmentation method that deals with the general inhomogeneity of a digital mammogram is outlined by applying a clustering algorithm. In general, a clustering scheme divides an input set (an image with its intensity values) into a set of groups—called clusters—by assigning a value, which represents a class, to each pixel. The goal of efficient clustering is to emphasise the boundaries between the objects present in the image, regardless of the size, position or level of visibility. One of the most investigated and well known techniques of clustering is K-means as described in general textbooks such as R. O. Duda, P. E. Hart, D. G. Stork, Pattern classification, John Wiley and Sons, Inc., 2001. In EP 6122899 A1, a Markov Random Field model was developed and applied as an extension to the general K-means method. A spatial dependency term was introduced that reduces the inhomogeneity of the segmentation result. The method however still leaves room for improvement.

First, the algorithm operates on the original unprocessed mammographic data. Because of the specific breast composition of fibrous, ductal and glandular tissues interspersed with fatty tissue, the mammographic appearance may be described by fairly large scale structures that account for mammographic densities on black backgrounds, and smaller scaled structures that give the tissue the appearance of texture, into which mammographic lesions are embedded. The model that will be proposed here will be based on the decomposition into a mean background signal and a texture detail image that characterizes the fluctuations of the detail around the mean. So, instead of operating on the original image data, the segmentation step will operate on a texture detail image.

Second, the number of classes is an important parameter in the EP 6122899 A1 disclosure. However, there is no method given to determine the number of classes either beforehand or automatically. To get the correct segmentation of the potential masses searched, different settings of the number of classes are needed resulting in a number of segmentations, including the one comprising the searched for segmentation. Hence, the different segmentations would have to be further processed in parallel by the CAD algorithm to eliminate the false positive candidates.

A number of prior art disclosures are also directed to techniques for correcting non-uniform breast thickness. These techniques are mainly focusing on the application of enhancing image quality for visualization in digital mammography. The non-uniform breast thickness arises from the specific compression geometry in mammography. On the one hand, the image area in the vicinity of the breast edge is slowly increasing when going from the breast edge towards the thorax side, where normally constant compression thickness is reached. On the other hand, due to tilt of the compression plate, the inner breast area may as well exhibit a non-flat cross-sectional profile.

In U.S. Pat. No. 7,203,348, a method and apparatus for correction of mammograms for non-uniform breast thickness is disclosed. The method comprises classifying pixels as either likely fat or non-fat. The method further comprises identifying a candidate distortion and calculating a histogram of the likely fat and likely non-fat pixels at the candidate distortion. The method further comprises evaluating a quality of the candidate distortion based on the features of the histograms of pixel values in the fat and dense tissue classes. The distortion may be a two-dimensional tilt of the plates or a three-dimensional deformation of the plates as in a bend. The algorithm is iterative in nature and optimizes among a set of candidate tilts.

A global parameter model of the compressed breast is also fitted to the mammographic data in R. Snoeren, N. Karssemeijer, Thickness correction of mammographic images by means of a global parameter model of the compressed breast, IEEE Trans. on Medical Imaging, vol. 23, no. 7, July 2004, pp. 799-806. Here, virtual tissue is added to the resulting thickness map so as to equalize tissue thickness resulting in an image that appears more homogeneous, and that has distribution of the pixels more concentrated in a smaller dynamic range. The proposed method is signalled as a useful tool for pre-processing raw digital mammograms that need be visualized, where gains are to be expected to be maximal for the breast area near the breast outline, where the breast bulges out.

In X. H. Wang et al., Automated assessment of the composition of breast tissue revealed on tissue-thickness-corrected mammography, American Journal of Roentgenology, Vol. 180, January 2003, pp. 257-262, the mammographic data are adjusted for tissue thickness variations before estimating tissue composition. For each pixel inside the breast a multiplicative thickness correction coefficient is computed as a function of the distance to the skin line. Features derived from histograms of corrected pixel values are then used in the classification in one of a number of archetypical breast classes (almost fat, scattered fibro-glandular densities, heterogeneously dense and extremely dense). Because of correction, the histogram represents a more accurate representation of the actual attenuation of breast tissue.

A sophisticated model for simulating and calibrating the mammographic imaging process has been described in Highman and Brady, Mammographic Image Analysis, Dordrecht, The Netherlands, Kluwer Academic, 1999. Based on a physics model-based approach, a measure $h_{int}$ is computed that represents the thickness of 'interesting' (non-fat) tissue between the pixel and the X-ray source. The representation allows image enhancement through removing the effects of degrading factors, and also effective image normalization since all changes in the image due to variations in the imaging conditions have been removed. The breast thickness turned out to be a key parameter in the computation of $h_{int}$.

SUMMARY OF THE INVENTION

The drawbacks of these approaches are that either complex equations have to be solved for deriving a representation suitable for visualization purposes, or that a classification approach is taken on the global image level.

The present invention relates to a method of detecting and segmenting candidate mass lesions in digital mammograms based on a cascaded filtering approach.

It is an aspect of the present invention to provide a method based on image filtering that copes with the aforementioned drawbacks of the prior art.

In general, according to one aspect, the invention features a method of detecting candidate masses in a mammographic image. The method comprises subjecting the mammographic signal representing said image to a cascaded filtering process, wherein the cascaded filtering process comprises background removal filtering for removing a globally varying component in said mammographic image and foreground candidate mass filtering, and subjecting a result of said cascaded filtering to segmentation.

In preferred embodiments, said background removal filtering comprises mid and/or high pass filtering said mammographic signal. Foreground candidate mass filtering by applying at least one even symmetric Gabor filter or at least one bandpass Gabor filter can be used. This filtering is performed using a Gaussian Laplacian Pyramid image decomposition method or using wavelet image decomposition. The background removal filtering is based on a physical model of breast composition and/or breast compression and comprises a minimum tracking filter from thorax side to mammographic skin line side. Preferably, the background represents the fat component of the breast. Foreground candidate mass filtering can comprise bandpass filtering using a Gaussian Laplacian Pyramid image decomposition method or using wavelet image decomposition.

In implementations, foreground candidate mass filtering comprises a blob detection process at multiple scales; segmentation of a mass is obtained as the central portion of the blob having a highest convolved filter response among said scales. The foreground candidate mass filtering other times comprises at least one even symmetric Gabor filter or at least one bandpass Gabor filter.

In general, according to another aspect, the invention features a computer executing a computer program product adapted to detect candidate masses in a mammographic image. The program product causes the computer to subject the mammographic signal representing said image to a cascaded filtering process, wherein the cascaded filtering process comprises background removal filtering for removing a globally varying component in said mammographic image and foreground candidate mass filtering, and subject a result of said cascaded filtering to segmentation.

In general, according to another aspect, the invention features a computer software product for detection of candidate masses in a mammographic image as described above.

The present invention is generally implemented as a computer program product adapted to carry out the method of any of the claims when run on a computer and is stored on a computer readable medium.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

(b) Filter coefficients of the Gaussian low-pass filter LP or the interpolators ↑.

Figure 5:
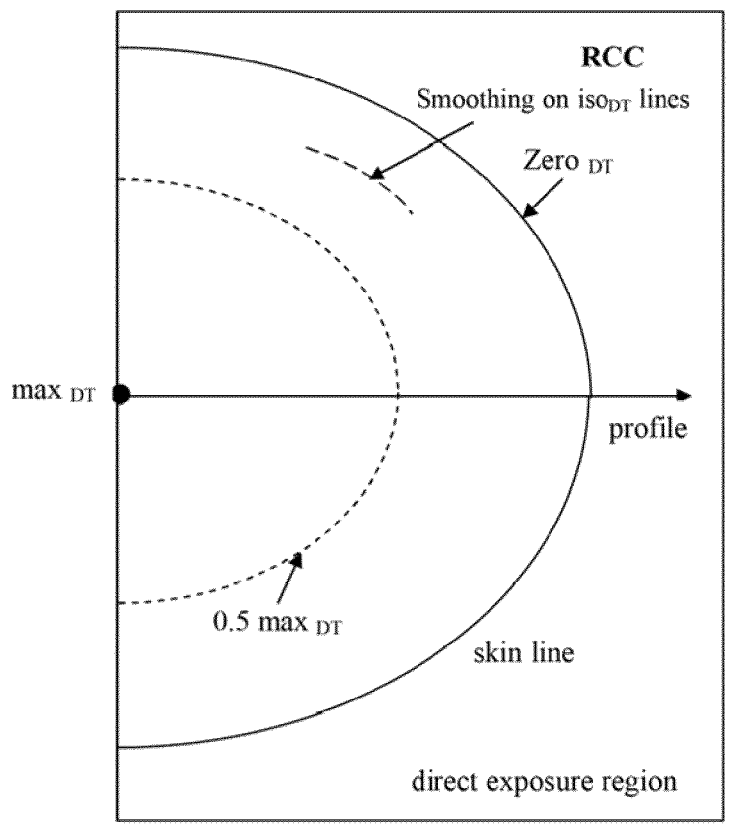
Figure 5:
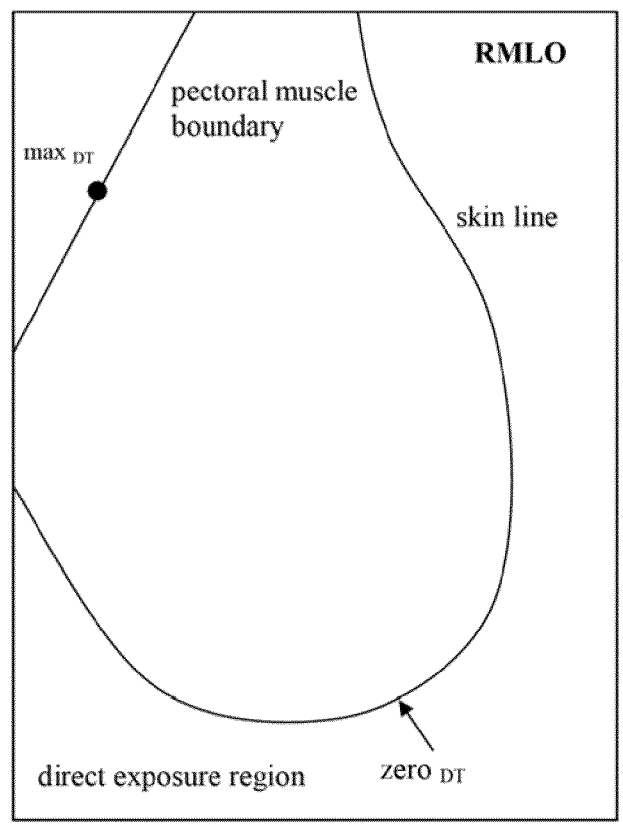

FIG. 5: Illustration of some components for computing the fat-corrected image. Details of the operation are in the detailed description.

Figure 6:
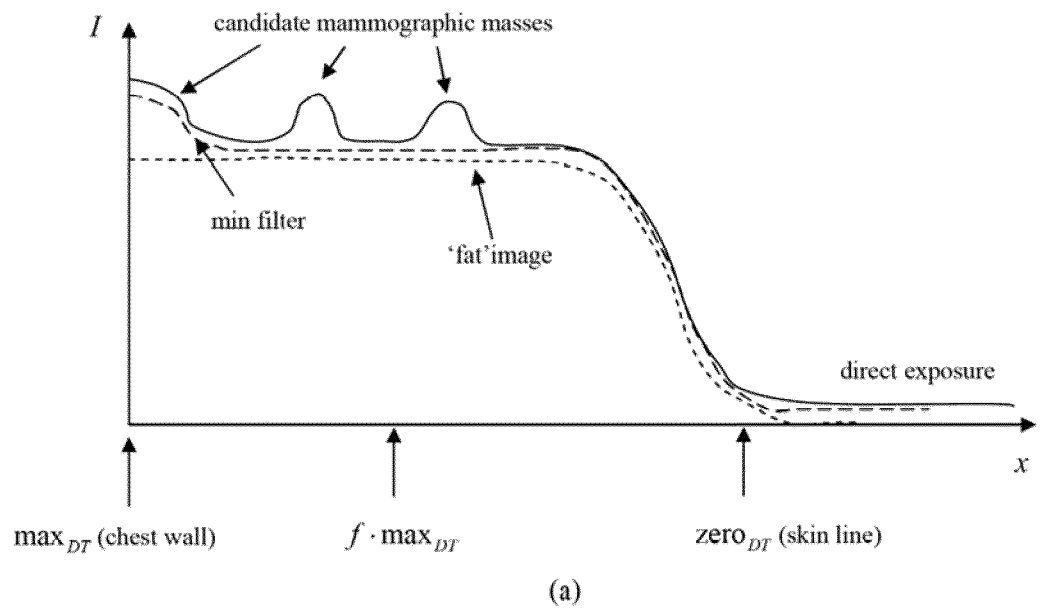

FIG. 6: (a) Profile through the point of maximum distance transform in direction of the direct exposure region. The minimum filter tracks the current minimum of the image pixel value associated the maximum distance transform point outwardly. The final 'fat' image accounts for any density bumps near the chest wall by considering the mean in the area enclosed by an iso-distance line corresponding to a fraction of the maximum distance. For clarity of presentation, the figure is not to scale.

FIG. 6: (b) 3×3 filter operation to track the fat-related breast component. The values in the cell are distance transform numbers. The minimum image value is taken over the set consisting of the central pixel, and all pixels having distance value greater than the distance value of the central pixel. This set is highlighted in grey. The minimum value thus obtained is assigned to the central pixel and the process is repeated until the shell of pixels with distance transform value equal to that of the current pixel have been visited, after which the process is iterated for the next higher distance value pixels.

Figure 7:
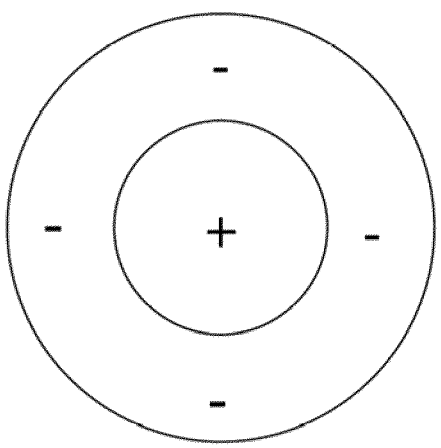
Figure 7:
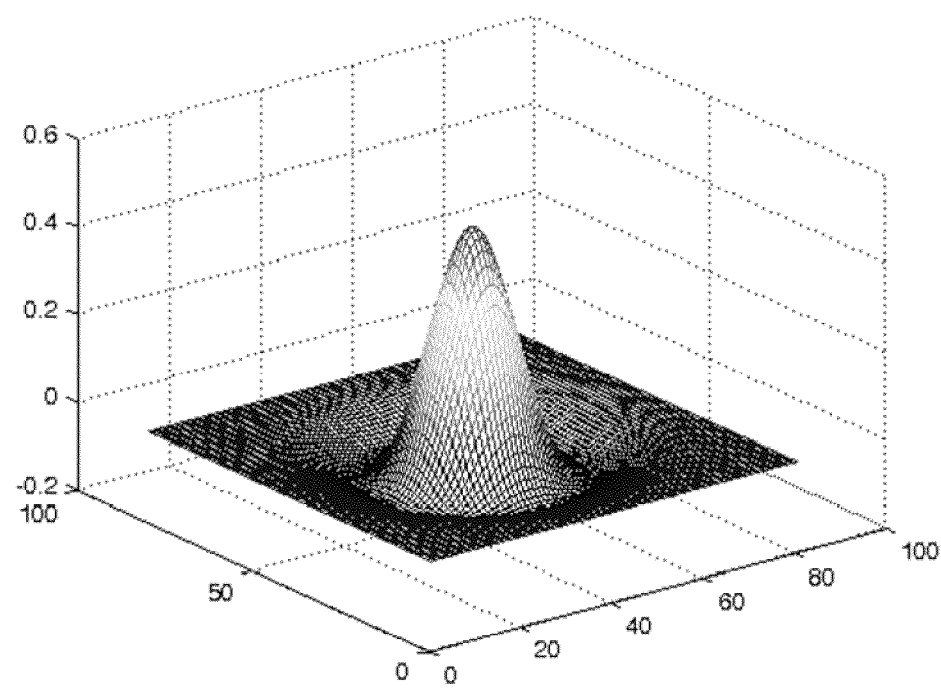

FIG. 7: Contour plot (a) and 3D plot (b) of the Laplacian operator. This filter has centre-surround response with a positive central portion (representing mass) surrounded by negative band (representing mammographic background).

Figure 8:
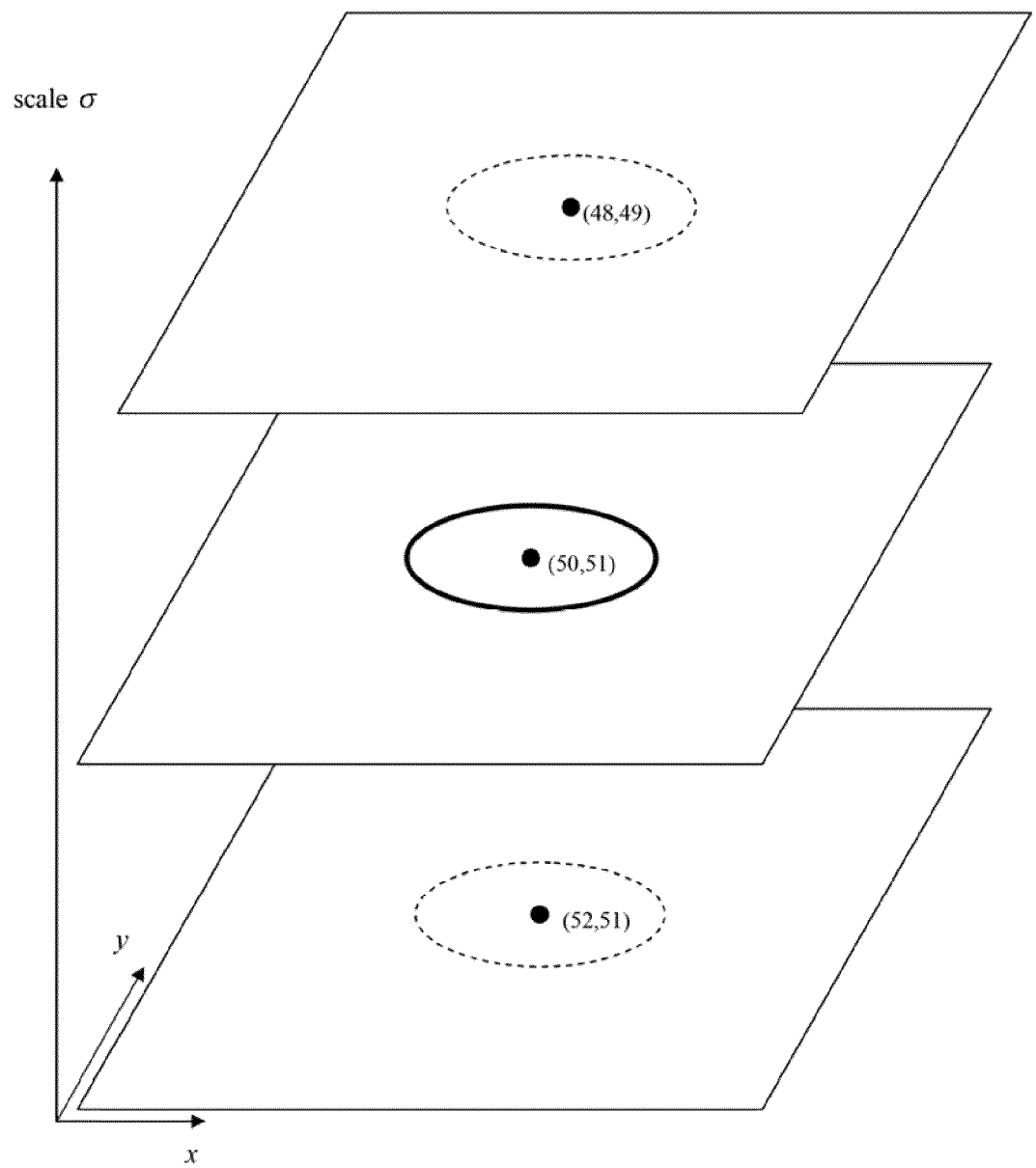

FIG. 8: Maxima of normalized Laplacian in spatial domain and tracked over scale. Larger intensity of the normalized blob detector is marked with a solid line. The output consists of the (x, y) position and the scale σ at which the maximum response is obtained. The scale σ can be regarded as an approximation to the radius of the blob.

Figure 9:
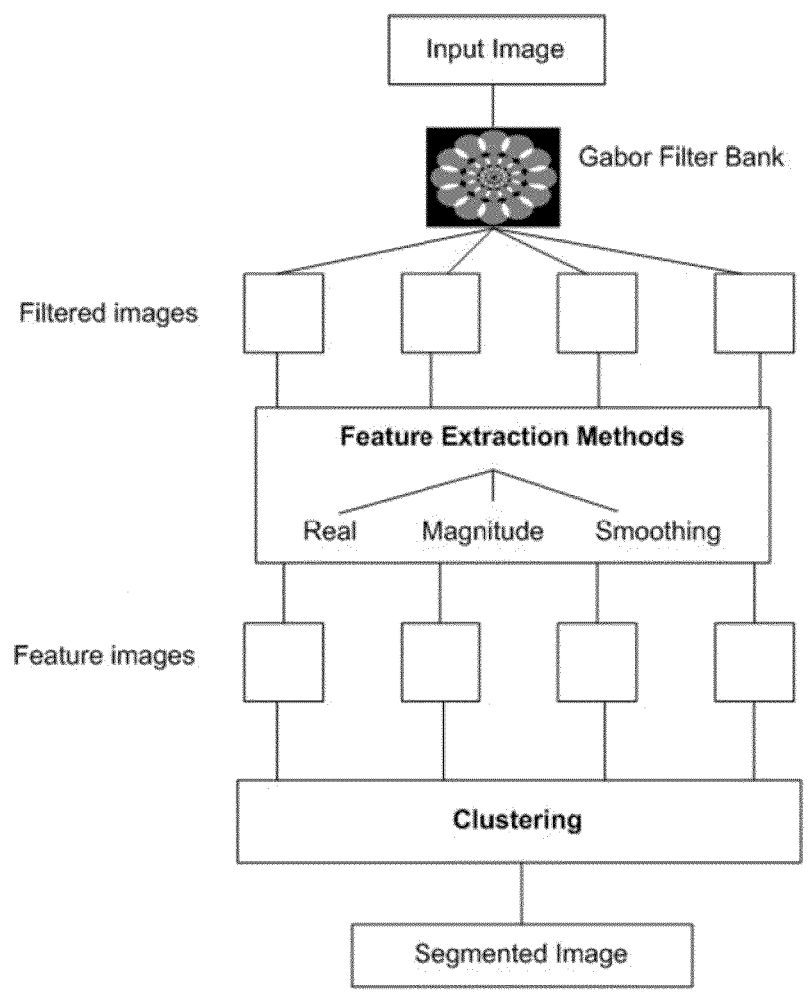

FIG. 9: Flowchart of operations involved in applying the Gabor filter bank concept for detection and segmentation of mammographic structures and masses.

Figure 10:
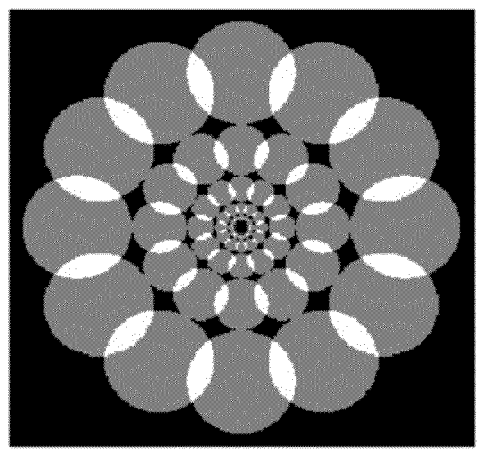

FIG. 10: Typical Gabor filter bank, which tessellates the frequency plane in almost non-overlapping portions, each centre-symmetrical pair representing a band-pass filter.

Figure 11:
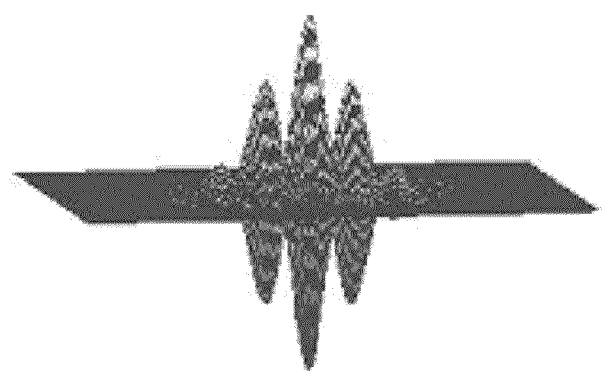
Figure 11:
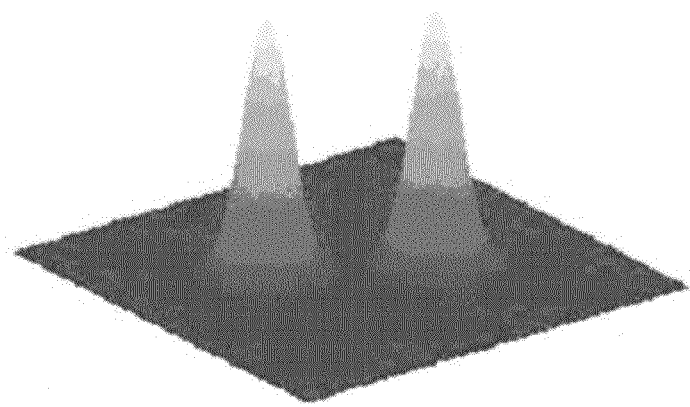

FIG. 11: (a) The Gabor function in the spatial domain. (b) The Gabor function in the spatial frequency domain.

Figure 12:
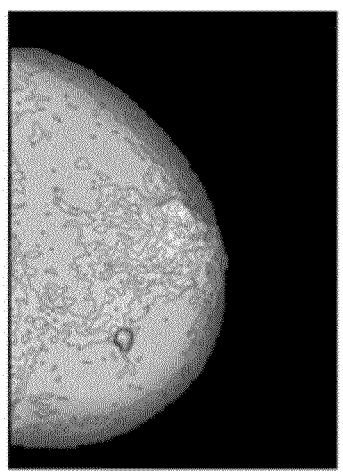
Figure 12:
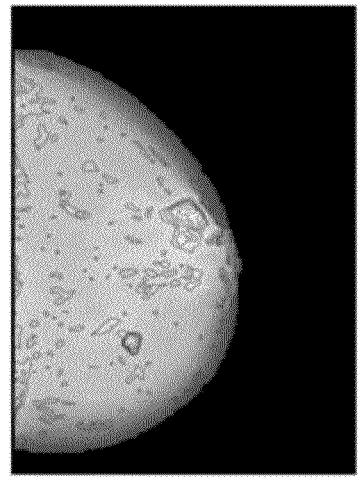
Figure 12:
Figure 12:
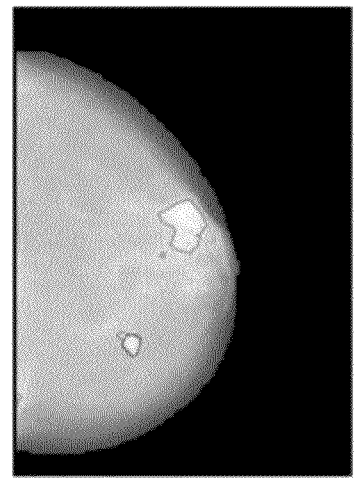
Figure 13:
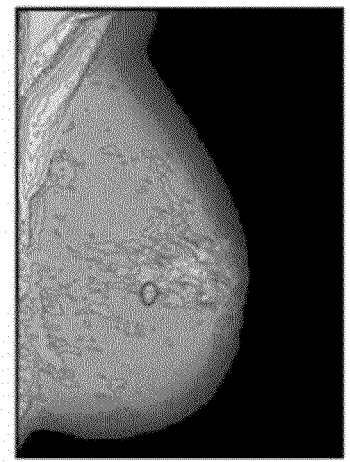
Figure 13:
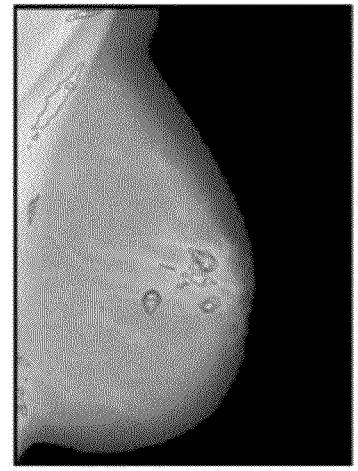
Figure 13:
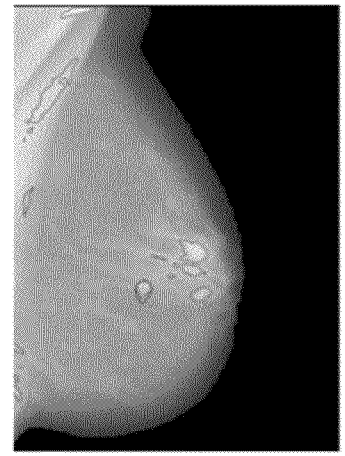
Figure 13:
Figure 14:
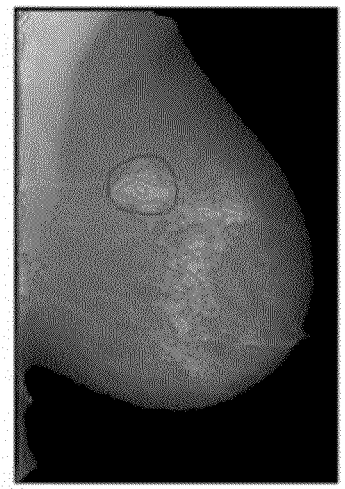
Figure 14:
Figure 14:
Figure 14:
Figure 15:
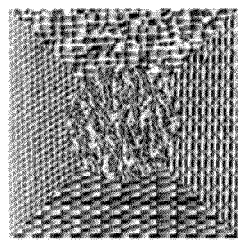
Figure 15:
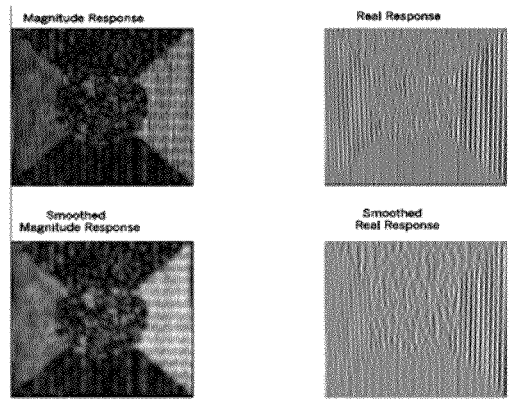
Figure 15:
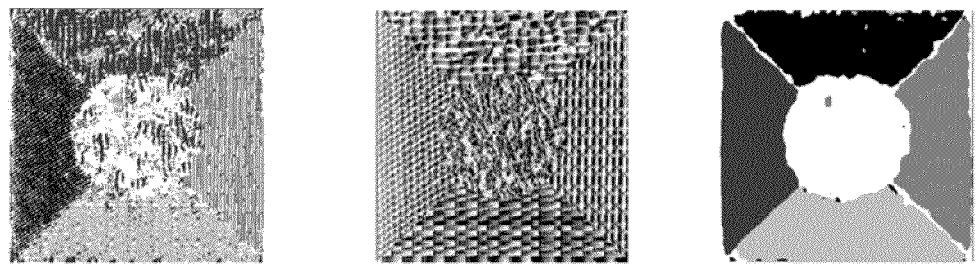

FIGS. 12, 13 and 14: Mammogram candidate mass generation and segmentation examples 1, 2 and 3. (a) a sample image with all the obtained iso-contours; (b) the sample image with the iso-contours after defining the length criteria; (c) the sample image with the iso-contours after defining the grey level criteria; (d) the sample image with the iso-contours after reducing the concentric contours FIG. 15: (a) Synthetic composition of 5 Brodatz textures; (b) Feature images obtained using (at the left) the magnitude and smoothed magnitude response from the filter output; and (at the right) real and smoothed real response from the filter output; (c) labelled segmentation of the input image retaken at the centre: (left) using unsmoothed magnitude response and (right) using smoothed magnitude response.

Figure 16:
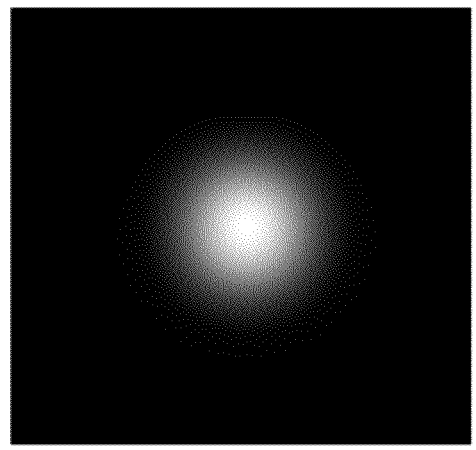

FIG. 16: Frequency response of an complex Gabor filter designed and applied for mammogram images FIG. 17: Frequency response of a band-pass Gabor filter designed and applied for mammogram images FIG. 18: Frequency response of an even symmetric Gabor filter designed and applied for mammogram images FIG. 19: Mammogram segmentation using the complex Gabor filter for example 1

Figure 20:
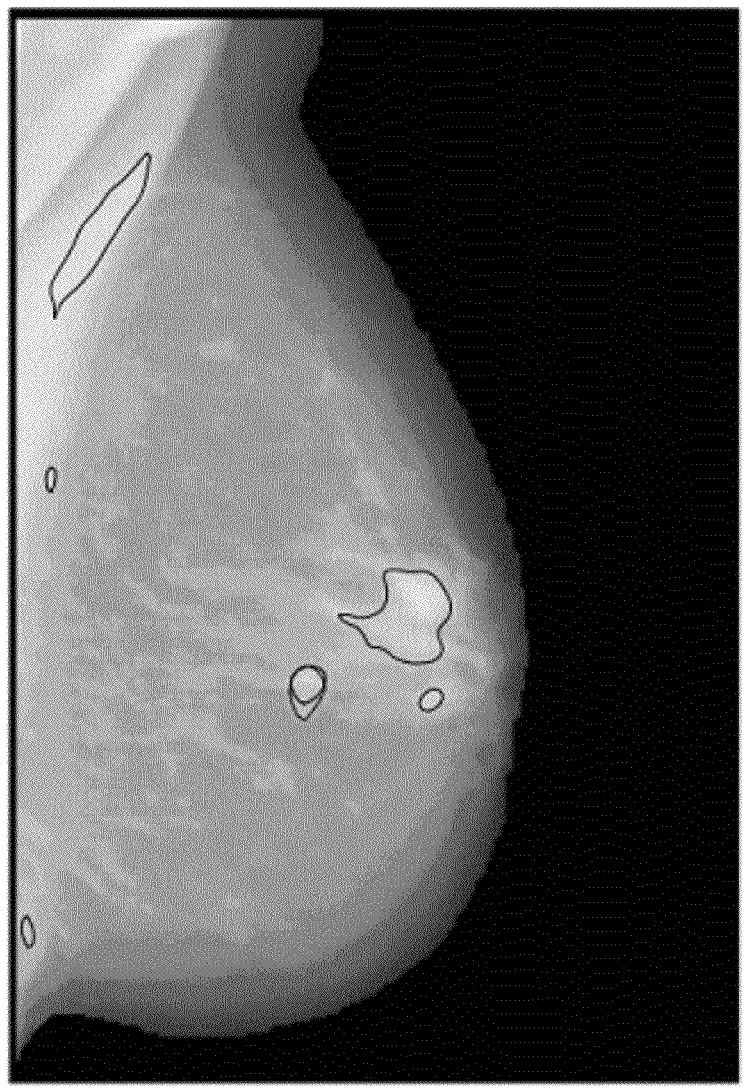

FIG. 20: Mammogram segmentation using complex Gabor filter for example 2

Figure 21:

FIG. 21: Mammogram segmentation using the complex Gabor filter for example 3

Figure 22:
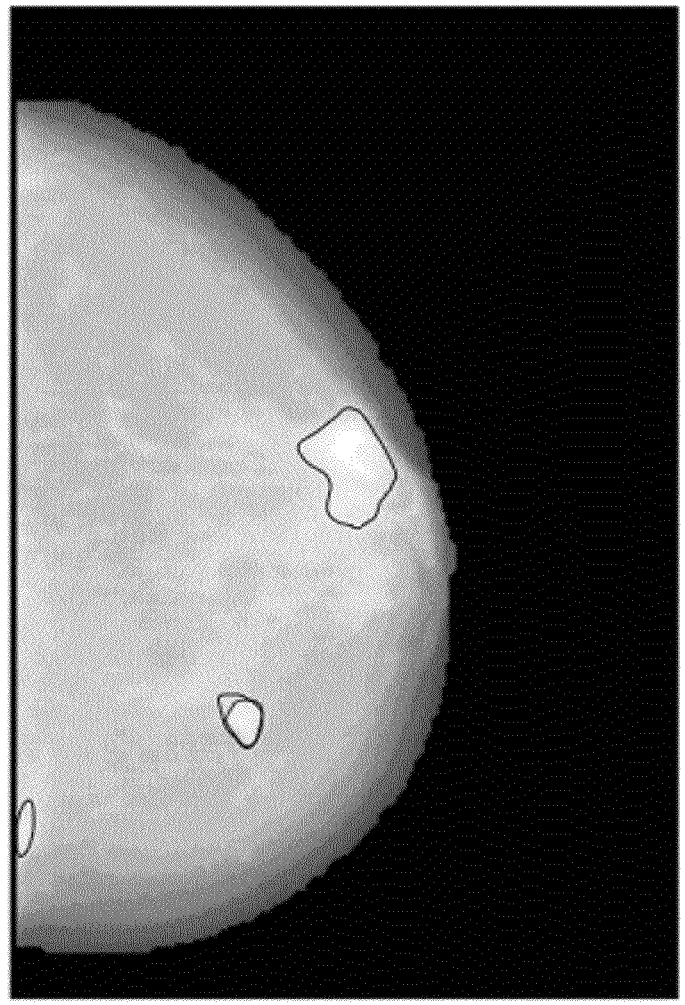

FIG. 22: Mammogram segmentation using band-pass Gabor filter for example 1

Figure 23:
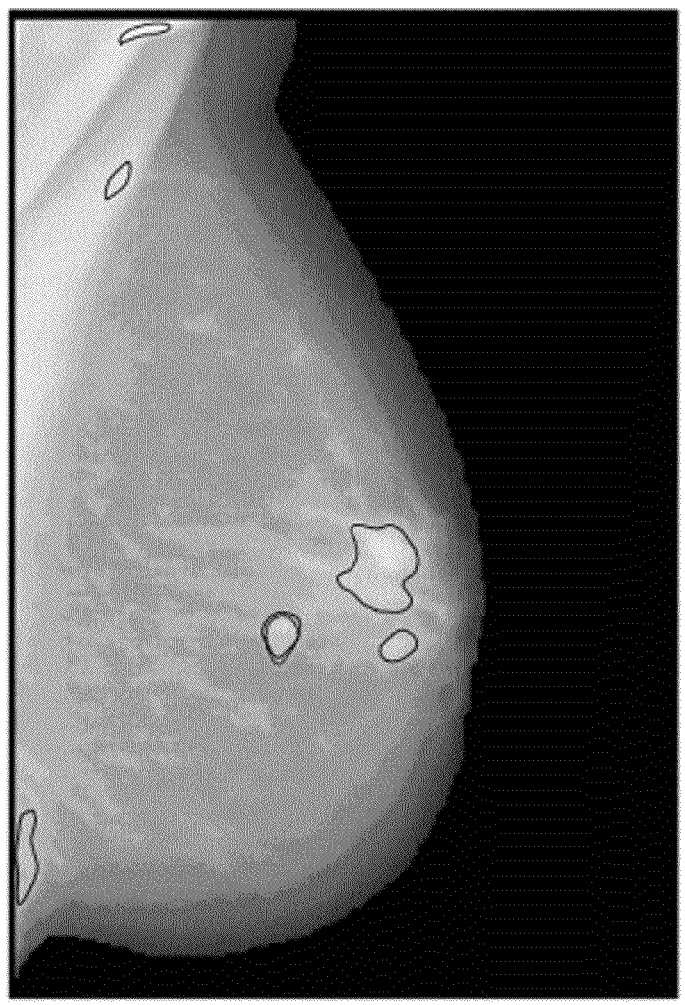

FIG. 23: Mammogram segmentation using band-pass Gabor filter for example 2

Figure 24:
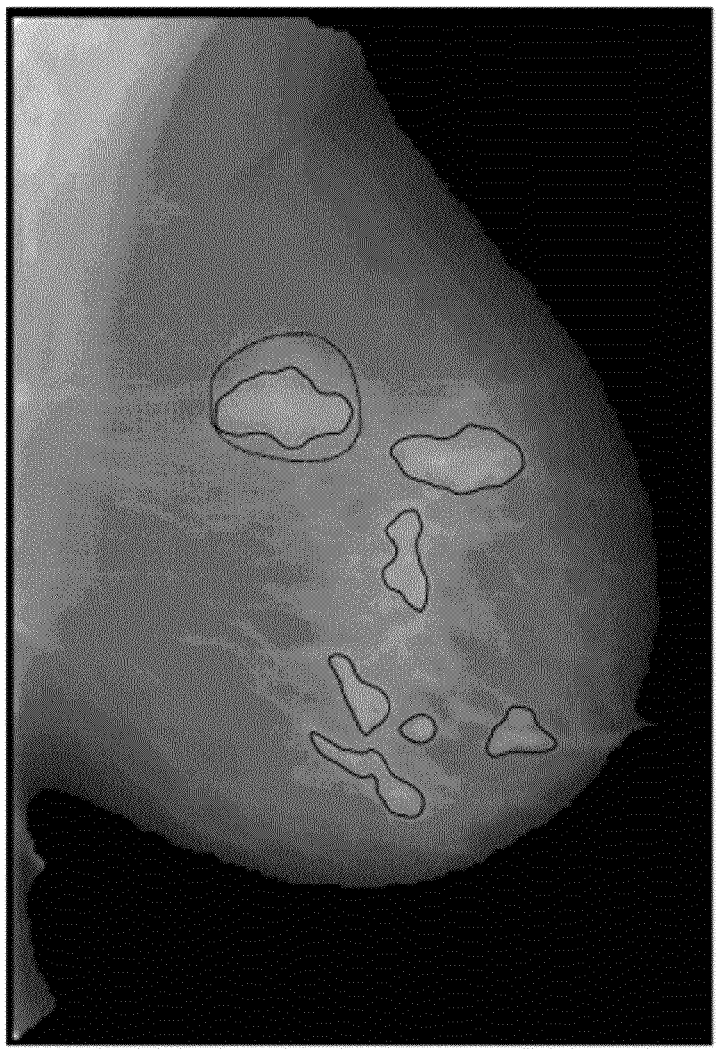

FIG. 24: Mammogram segmentation using band-pass Gabor filter for example 3

Figure 25:
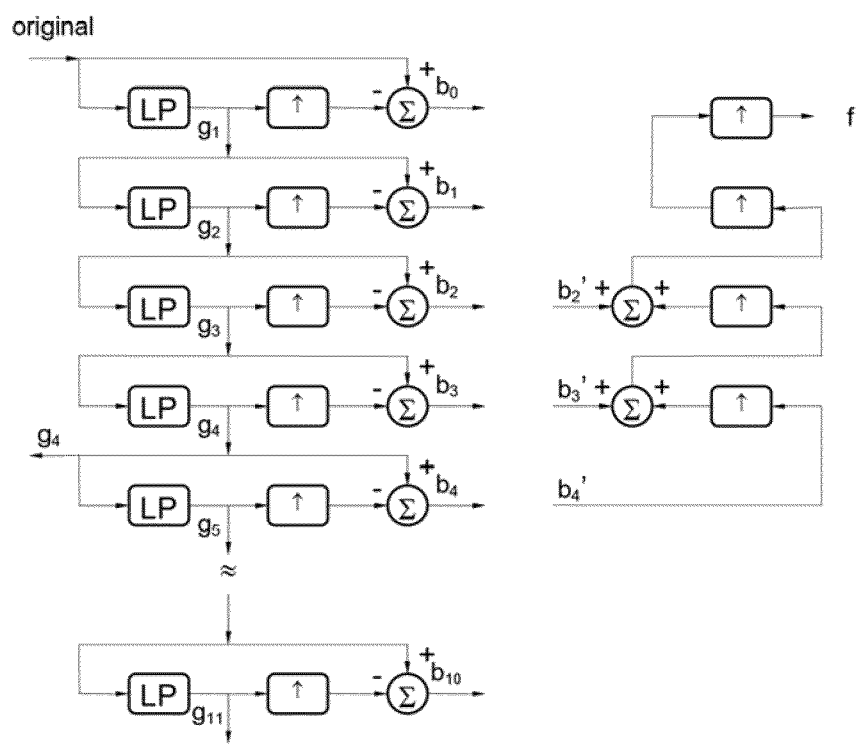

FIG. 25: Band-pass filter for combined background and foreground processing using the Gaussian-Laplacian pyramidal image decomposition.

Figure 26:
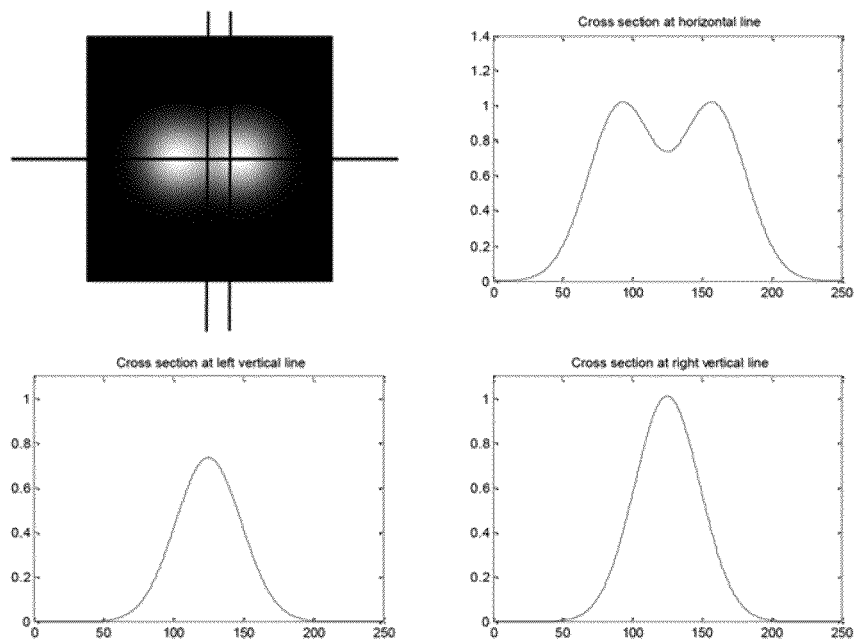

FIG. 26: The even symmetric Gabor frequency response (upper left) with 1-D response through the horizontal v=0 (upper right), the vertical u=0 (lower left), and the vertical through maximum response (lower right).

Figure 27:
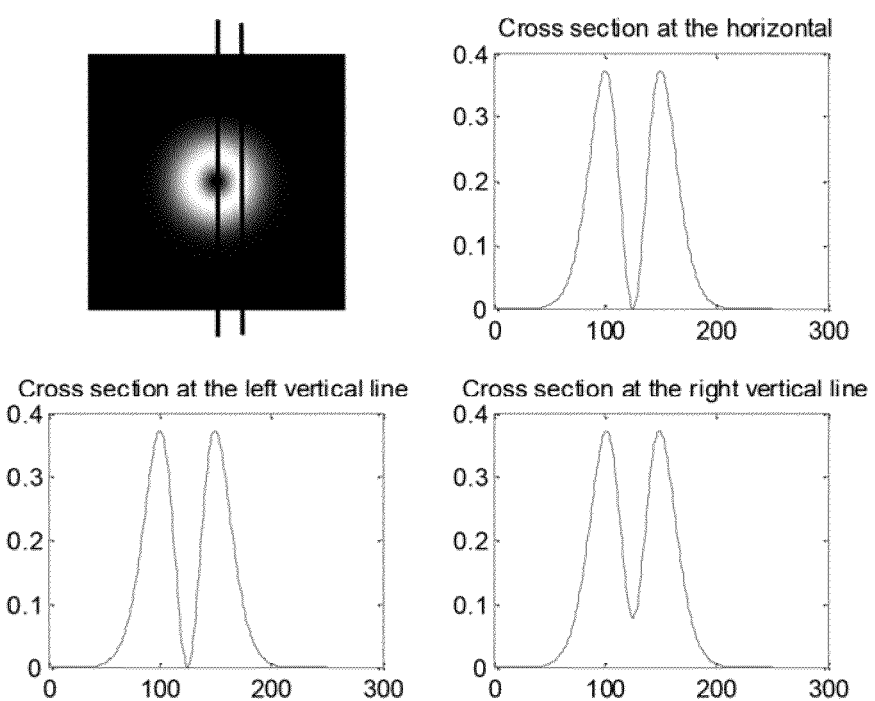

FIG. 27: The wide-hole band pass Gabor frequency response (upper left) with 1-D response through the horizontal v=0 (upper right), the left vertical u=0 (lower left), and the right vertical (lower right).

Figure 28:
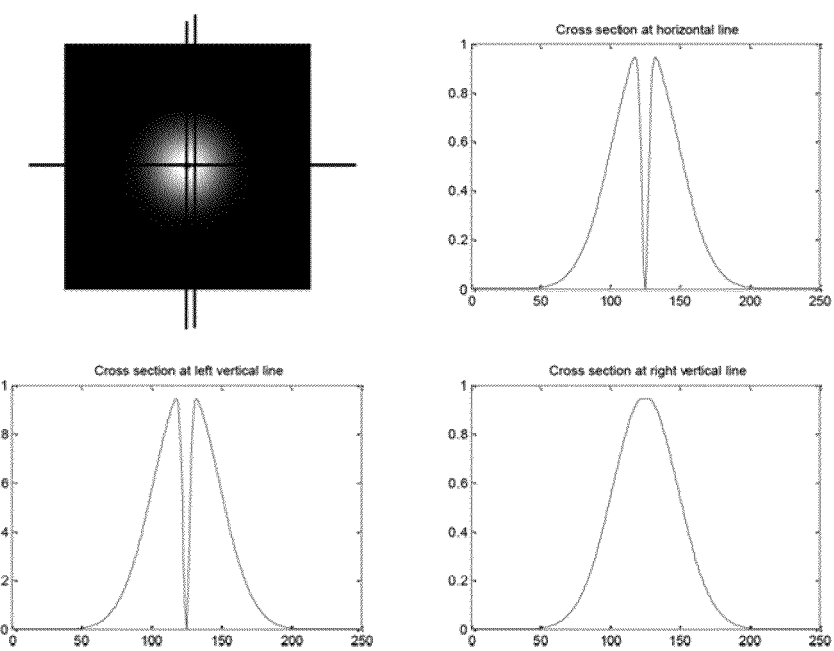

FIG. 28: The narrow-hole band-pass Gabor frequency response (upper left) with 1-D response through the horizontal v=0 (upper right), the left vertical u=0 (lower left), and the right vertical (lower right).

DETAILED DESCRIPTION OF THE PREFERRED EMBODIMENTS

Figure 1:
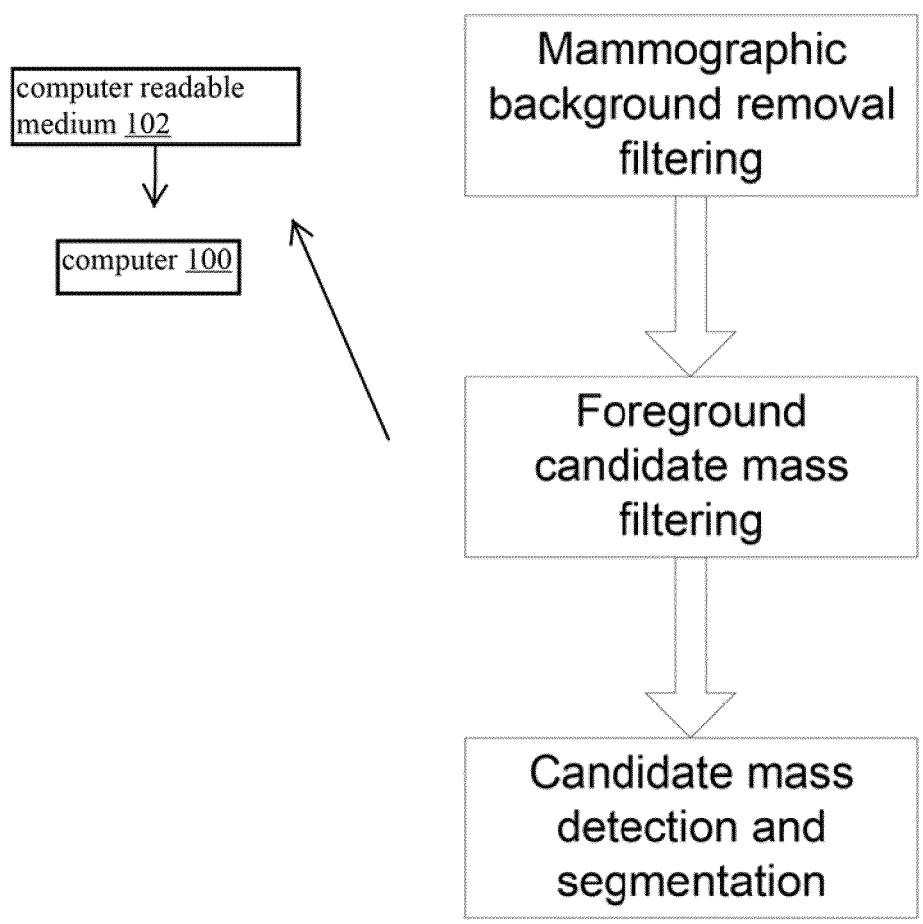
FIG. 1: General two-component concept for candidate mammographic mass generation (including detection and segmentation)

The main concept that is used to address the candidate lesion (i.e. mass) generation problem is to link a background removal operation with a foreground candidate lesion signalling algorithm. This cascaded approach includes the steps shown in FIG. 1, which are manifest in a computer program product that is stored on a computer readable medium 102 and executed by a computer 100. Although the foreground candidate lesions operate independently and may be applied solely, the underlying principle is that by first removing the background, an improved outcome of the second stage is obtained. This improvement may for example consist of less false positive candidate mass locations or less noisy segmentations of the candidate masses. Both stages primarily rely on applying digital filtering operations.

Figure 2:
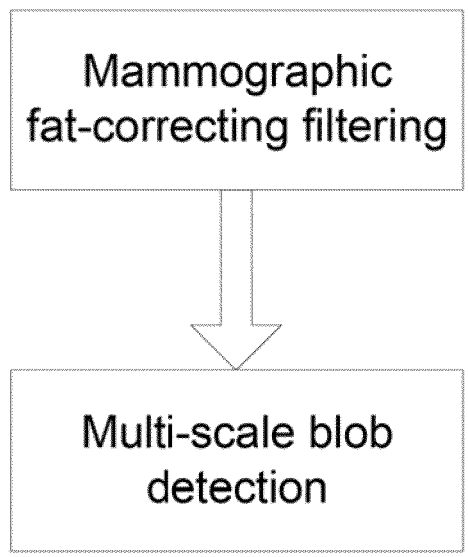
FIG. 2: Two strategies based on the two-component image processing model for mass candidate generation: (a) strategy based on a physical model of breast composition and compression; (b) signal processing approach.
Figure 2:
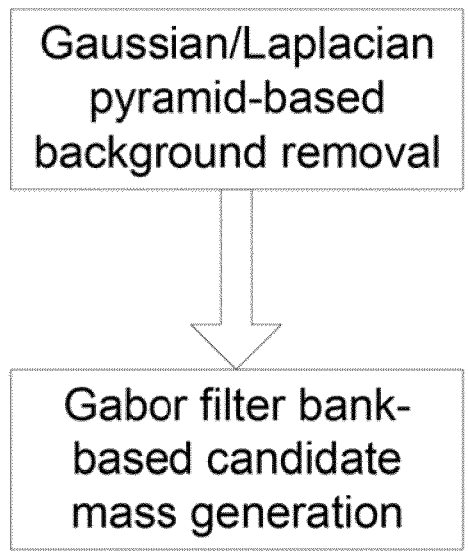

Two embodiments of this two-stage approach are depicted in FIG. 2.

The first embodiment focuses on a filtering approach taking into account a model of the fat background in the spatial domain. We base ourselves solely on the geometry of the breast with the basic assumption that the fat component inside the breast is larger than near the skin line. This will result in a robust computational scheme, which tracks a minimum-signal filter value radially outwards, starting from the central breast portion towards the breast skin line (and hence avoiding the overlap of profiles perpendicular on the breast outline). Instead of computing a height corrected image, a fat-only image representation is computed directly on the basis of the mammographic data, and this representation is further used to compute mammographic lesion candidates. These candidates are modeled as blobs with varying intensity and spatial extent and are extracted by a multi-scale maximum selection algorithm that looks both for local maxima of the Laplacian feature operator and for local maxima in the scale direction of the Laplacian operator. The output mammographic mass candidates are represented by the spatial coordinates of the maxima and their spatial support is represented by the standard deviation associated with the scale of the Laplacian operator that yielded maximum result.

The second embodiment focuses on a filtering approach taking into account a model of mammographic mass content in the frequency domain. Masses, superimposing on the background signal, show up as mid-frequency signal components in the frequency domain; in the spatial domain they have finite extent. A wavelet-based approach is ideally suited to deal with these detection requirements in that the wavelet kernel is compactly supported in the spatial as well as frequency domain. A bank of filters is needed to address the wide variety of mammographic mass appearances. The wavelet filter bank that is adopted here is the Gabor filter bank that tiles the frequency plane in slightly overlapping Gaussian-shaped windows. The filter results are clustered and iso-filtered contours are computed that serve as a segmentation of the mammographic mass candidates.

The main assumption for generating regions containing candidate lesions is that the total mammographic breast content can be modelled as a slowly varying background image onto which the texture detail and the lesions are superimposed. The texture detail and lesions typically have dimensions that are substantially smaller than the gross background variations. Furthermore, their shape could be classified as either point-like (such as micro-calcifications), line-like (such as linear or curvilinear texture detail) or area-occupying (such as masses). Apart from substantially greater masses, which are therefore more easily identified by the radiologist, these mammographic details have low area, and therefore a background image that is derived from the original data will only slightly be affected by the presence of these details. This property enables a computed background approximation to pass through them, with parameters of the approximation only slightly modified. Hence the subtraction signal would still exhibit sufficient residual signal level, and would comprise the regions containing candidate lesions. Because a mammogram is a projection image, these lesions will not appear as isolated densities, but are immersed in the parenchyma tissue patterns, and hence there will typically be many false positive candidates.

Methods that Address the Mammographic Background Image Content

Two approaches are taken here depending on whether a physical model of the breast composition and the breast compression is taken into account or not. First, a method that does not assume such physical model is detailed; it is founded on signal processing principles only. Second, a method is disclosed that produces a fat-corrected image while simultaneously taking into account the varying breast thickness due to breast compression.

Approach Based on a Signal Model

The pyramidal decomposition and reconstruction of an image such as first introduced in P. J. Burt, Fast filter transforms for image processing, Computer Graphics and Image Processing, vol. 6, p. 20-51, 1981 is used to model the background image content. This pyramidal framework was also used in EP 0823691 to generate a calibration matrix for a recording member to correct pixels of a radiation image for non-uniformities present in the recording member.

Figure 4:
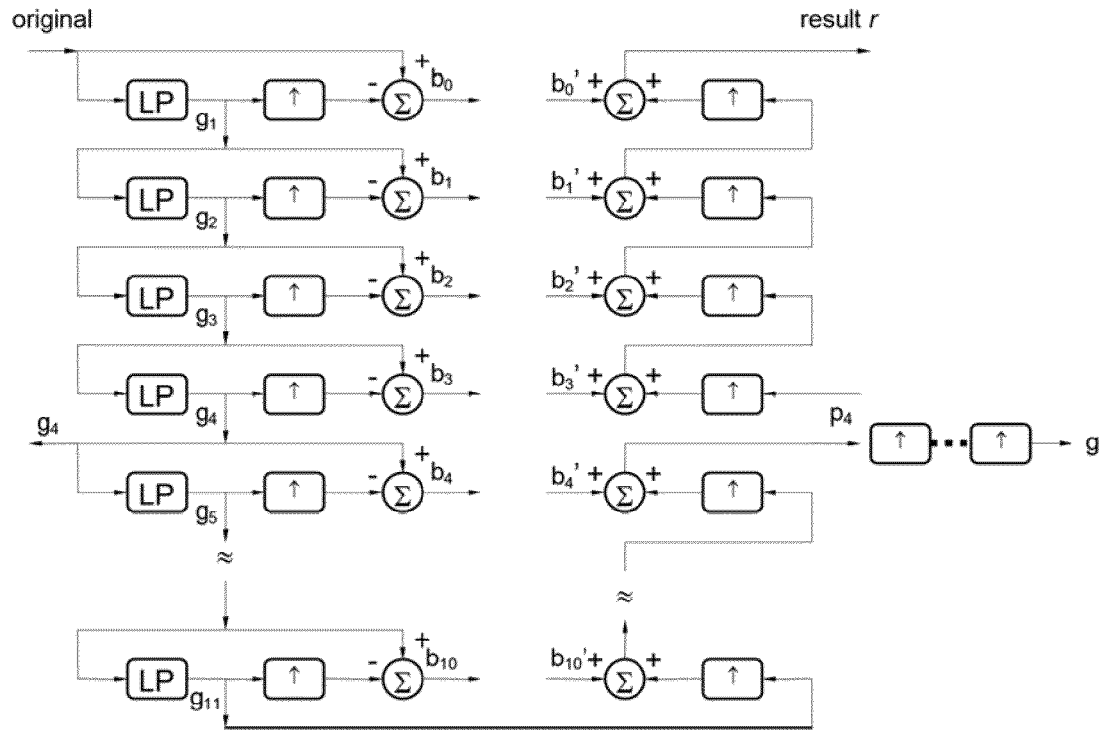
FIG. 4: (a) Signal processing approach to mammographic background estimation. The background $g_4$ is computed by the reconstruction of the coarsest detail levels $b_4 \ldots b_{10}$ of the Gaussian pyramid. The coefficients of these levels may be modified to as to amplify smaller coefficients or suppress larger coefficients; the reconstructed image is $p_4$, which is interpolated to the size of the original image to yield the background image g. The complementary residual image is formed by reconstructing the finest detail levels $b_0 \ldots b_3$ so as to yield the foreground detail image r comprising the candidate mammographic masses. These detail levels may also be modified so as to amplify the amplitudes associated with mammographic masses.

A specific embodiment of the decomposition process is depicted in FIG. 4. and consists of the following steps.

Step 1. Gaussian-Laplacian Pyramidal Image Decomposition

The original image $z(i, j)$ is filtered by means of a low-pass filter LP, and sub-sampled by a factor of two, which is implemented by computing the resulting low resolution approximation image $g_1$ only at every other pixel position of every alternate row. A detail image $b_0$ at the finest level is obtained by interpolating the low resolution approximation $g_1$ with doubling of the number of rows and columns, and pixel-wise subtracting the interpolated image from the original image z. The interpolation is effectuated by the interpolator ↑, which inserts a column of zero values every other column, and a row of zero values every other row respectively, and next convolves the extended image with a low-pass filter. The subtraction is done by an adder Σ. The same process is repeated on the low resolution approximation $g_1$ instead of the original image z, yielding an approximation of still lower resolution $g_2$ and a detail image $b_1$. A sequence of detail images $b_i$, i=0 ... L−1 and a low resolution approximation $g_L$ are obtained by iterating the above process L times. The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of rows and columns is halved, in accordance with the Nyquist criterion. After the last iteration an image $g_L$ ($g_{11}$ in FIG. 4 (a)) is left which can be considered to be a very low resolution approximation of the original image. In the extreme case it consists of only 1 pixel which represents the average value of the original image z. The filter coefficients of the low pass filter of the preferred embodiment are shown in FIG. 4 (b). They correspond approximately to the samples of a two-dimensional Gaussian distribution on a 5×5 grid. The same filter coefficients are used for the low pass filters LP at all scales. The same filter kernel with all coefficients multiplied by 4 is also used within the interpolators ↑. The factor 4 compensates for the insertion of zero pixel columns and rows as explained above.

Step 2. Background Image Computation

The decomposition of the original image z consisting of a background g and a residual component r $$z(i,j)=g(i,j)+r(i,j)$$

is depicted in FIG. 4. Each of g and r is obtained by reconstruction using the appropriate subsets of pyramid levels, as explained next.

The background image g is obtained by reconstruction using the lowest resolution levels. The coarsest resolution image $g_L$ is first interpolated by interpolator ↑ to twice it original size and the interpolated image is next pixelwise added to the image of the next coarsest level $b_{L-1}$ using the adder Σ. The resulting image is interpolated and added to the next finer detail image. If this process is iterated L−M times using the unmodified resolution levels $b_{L-1}, \ldots, b_M$, a low-resolution background image will result. In FIG. 4, by way of example L=11 and M=4; when the resolution levels $b_i$ are unmodified, the reconstructed signal $p_4$ equals $g_4$. This image $p_4$ is blown up to the size of the original image z by means of a sequence of M interpolators to yield the background image g. If M=L, and the detail images $b_{L-1}, \ldots, b_M$ are left unmodified, the original image z will result by this reconstruction process.

Step 3. Residual Image Computation

The residual image, containing the mammographic detail including prospective masses can be obtained by reconstruction using the highest resolution levels. Starting from resolution level M, the detail image $b_{M-1}$ is interpolated by interpolator ↑ to twice its original size and the interpolated image is next pixel-wise added to the image of the next finer detail level $b_{M-2}$ using an adder Σ. The resulting image is interpolated and added to the next finer detail image. If this process is iterated M times using the unmodified resolution levels $b_{M-1}, \ldots, b_0$, a full resolution residual image r is obtained.

Obviously, r and g need not be computed simultaneously: either g is computed and r can be obtained in a straightforward manner as r=z−g, or r is computed and g can be obtained as g=z−r by image subtraction. A further step of candidate mass extraction will now operate on the residual image.

Approach Based on a Physical Model

A different approach to modelling the breast density background was obtained in assessing the fat component of the mammographic component, given a physical model of the breast compression.

For fatty breasts, the fat component can be assumed constant inside the breast due to constant breast height. The breast compression ensures that the central portion of the breast has constant thickness. The fat component for breast portions nearing the skin line drops slowly to zero because the path length is reduced to zero at the skin border. The mean breast density component will now be estimated by leaving out the image component related to fat.

For dense breasts, with less or no fat component, the assumption is that the mean density can be estimated while guaranteeing that area occupying lesions such as masses are still retained the final image. This assumption is based on the observation that masses do not contribute to the mean density and are superimposed on the mean density signal.

The equation governing the output intensity I of the X-ray beam leaving the breast is given by $$I = \int I_0 e^{-(\mu_F + \mu_T)x} dx$$

where $I_0$ denotes the input intensity, $\mu_F$ and $\mu_T$ represent the attenuations coefficients of fat resp. tissue, and x is the path length variable. In general it is not mathematically tractable to solve for the fat component from this equation, as the spatial distribution of fat and fibro-glandular tissue inside the breast is unknown. However, some conclusions can be drawn regarding the detectability of masses using the attenuation principles.

It is known that the polychromatic spectrum of the X-ray beam changes as it passes through attenuating material. This phenomenon is known as beam hardening and involves a shift of the input spectrum towards higher energies (keV). A higher energetic beam passes more easily through an object and hence the contrast of the object with respect to its background will be lower, i.e. less detectable. The effect of beam hardening is more severe when the more absorbing structures (fibro-glandular tissue) are situated earlier in the X-ray beam, e.g. lie above in the compressed breast. Conversely, the beam hardening effect is less pronounced when the less absorbing tissue (e.g. fat) comes first. Ignoring scattering effects, a mass will hence have higher contrast in the resulting image when it is embedded in top layers of the breast, and even more so when the fat would also be concentrated in an upper layer. However, in reality there will normally be an irregular distribution of fatty and fibro-glandular tissue in the breast, and masses may equally probable lie in upper or lower layers of the compressed breast. We will therefore direct our attention to a method to estimate the fat component of breast from the mammographic image that does not make any assumptions as to breast composition, tissue distribution or mass location.

The different steps to estimate the fat component of the breast density will now be described in detail.

Step 1. Breast Segmentation

This step consists of breast skin line detection and segmentation on CC and MLO views and an additional step of pectoral muscle detection and delineation on the MLO view.

The purpose of this step is to define the end points for estimating the fat component related to breast density. Obviously, the fat component drops to zero at the skin line of the breast, and the skin line will serve as a geometric boundary condition for the fat component estimation process.

The breast outline for CC as well as MLO incidences is segmented from the breast image using techniques from the prior art such as outlined in EP887769. The result is a one pixel thick outline separating the breast mass from the direct exposure region.

The pectoral muscle outline on MLO incidences is segmented from the remainder of the breast area using techniques from the prior art such as outlined in R. J. Ferrari et al, Automatic identification of the pectoral muscle in mammograms, IEEE Trans. On Medical Imaging, Vol. 23, No. 2, February 2004, p. 232-245. As for the skin line, a one pixel thick segmentation results.

Step 2. Distance Image Computation

Starting from the skin line, a distance transform is computed by propagating distances towards the inside of the breast. The pixels on the skin line receive a zero distance value. Pixels in the direct neighborhood of the skin line and towards the inside the breast mass receive a distance value of one. This process is iterated for all pixels inside the breast mass, by incrementing the distance values of the neighboring pixels, until all pixels inside the breast are visited. Pixels belonging to the pectoral muscle area are excluded from this process. Each breast mass pixel thus holds a distance value that represents the distance of the pixel towards the nearest pixel on the breast skin line.

Instead of iteratively propagating the distance values, the distance transform can be efficiently computed using methods of the prior art such as described for example in Per-Erik Danielsson, Euclidean distance mapping, Computer Graphics and Image Processing, Vol. 14, p. 227-248, 1980. These techniques require only a limited number of passes over the image (typically a forward and backward scan), resulting in computation time linearly proportional to the number of pixels in the image.

Step 3. Point of Maximum Distance Selection

For the mammographic CC views, the distance image has maximal value at the innermost point of the breast located near the thorax wall, as depicted in FIG. 5. Multiple maxima may be obtained also. For the MLO incidence, the points of maximum distance value typically lie on the pectoral muscle boundary. When multiple points of maximum distance are obtained, the most central one is selected.

The location of the point of maximal distance serves as input for the next step.

Step 4. Propagation of Floating Minimum Density Value

This step will trace the fat-related component of density inside the breast. This step primarily relies on the physical model of breast compression in that the fat component drops off to zero when going from the inside of the breast image towards the edge of the breast. Algorithmically, this amounts to radially propagating the minimal value from the inside of the breast towards the edge, whereby the traced minimal value represents the density component related to fat. Any image detail superimposed on this component will hence be canceled out during filtering.

Starting from the point of maximum distance transform, the minimum density value is filtered as follows. The pixels having distance value just smaller than the maximum distance value are visited first. The set of these pixels can be looked at as a shell around the set of already visited pixels. For each pixel of the shell, a n×n neighborhood is considered (typically a 3×3 neighborhood will be appropriate). The central pixel receives a value equal to the minimum value among the subset of pixels consisting of the current pixel and all neighbors having a distance to the skin line that is greater than the distance attached to the current pixel. A 3×3 neighborhood is depicted in FIG. 6 (b) with distance values w.r.t. the breast skin line filled in. The subset for the local minimum filter hence comprises the pixels on grayed background. By continuing the minimum selection process for pixels associated with increasing distance transform values, the minimum filter values spread out in a radial way until the breast skin line is reached.

The result of the floating minimum propagation on a profile with original density values, taken through the maximum distance pixel and extending towards the breast skin line is depicted in FIG. 6 (a).

Step 5. Directional Smoothing

The image output by the previous step still contains noisy artifacts, due to the operating principle of the distance transform. These artifacts can largely be smoothed by applying a directional smoothing filter. The direction of smoothing is along lines containing equidistant points. These lines will be perpendicular on the radially extending profiles where the floating minimum operator was applied and for pixels nearby the breast skin, the smoothing operates on pixels lying on curved lines that are approximately parallel to the skin line, as depicted in FIG. 5. This ensures that noise pertaining to the fat component is smoothed while still preserving the contrast of superimposed detail such as masses. The result is that the profiles through the point of maximum distance value exhibit smoother appearance, and will lead to smaller false positive candidate masses.

Step 6. Correction Applied to the Central Breast Portion

As the central breast portion is in full contact with the compression plate, the breast density is in principle constant in that area. However, the step of floating minimum tracing, which starts in the central area, follows any superimposed densities that touch the thorax edge. Hence superimposed detail at the thorax side would also be contained in the final fat image, and hence would not be detectable anymore as a potential mass. This effect is depicted at the left side in FIG. 6 (a). To correct for this phenomenon, the mean fat image in the central portion is estimated over a larger area $A_c$, with the assumption again that the area of the superimposed lesions are substantially smaller than the area $A_c$ so as to have only negligible effect on the mean value.

The area $A_c$ is determined automatically by selecting an iso-distance line in the distance transform of the breast region. This iso-distance line is associated with the distance $f_{A_c} d_{max}$ with the fraction $f_{A_c}$ typically 0.5. The mean value inside the central portion $A_c$ is computed as $\overline{A}_c$.

Whenever the pixel value for all pixels inside $A_c$ is larger than $\overline{A}_c$, the pixel value is replaced by the mean value, otherwise the original value is kept. This correction has the effect that bumps superimposed on the mean value $\overline{A}_c$ are removed, hence a more correct fat estimation image results. The effect on a radially extending profile is shown in FIG. 6 (a).

The fat-corrected image will now be input to a foreground mammographic mass detection method.

Methods that Address the Mammographic Image Content

In the next sections, methods that address the radiographic appearance of mammographic content, as outlined in the introduction, are now detailed. In contrast to the previous section that focuses on the breast background signal, here the complementary foreground signal is filtered. This mammographic detail contains the typical mammographic texture and densities into which the lesions are embedded or superimposed. The notion of scale plays an important role in the design of the filters, as the mammographic lesions typically encompass a large range of sizes. Also, filters should be invariant to rotation (and obviously also translation) of the searched for structures, meaning that the transformation has no effect on the value of the function.

Mammographic Foreground Generation by a Signal Processing Approach

The background filtering using signal processing principles can be complemented by a foreground filtering step, and both approaches can be integrated because they use the same pyramidal image decomposition. The combined background and foreground filtering is depicted in FIG. 25, and is obtained as follows.

The residual image r, containing the mammographic detail, is only partially reconstructed, by omitting a number of the finest detail levels. These detail levels pertain to image noise, anatomical noise and image detail not related to mammographic lesions. In the figure, by way of example, the levels $b'_0$ and $b'_1$ have been omitted with respect to FIG. 4. As the residual image was already obtained by leaving out the low-frequency components, $b'_{10}$ till $b'_5$ in the example, the resulting signal is effectively a band-pass filter, consisting of recombining the sequence of levels $b'_4$, $b'_3$, and $b'_2$ in the example. In the limiting case when the sequence would only consist of one level, the band-pass filter is the result of the difference of two Gaussian filtered images, one with a smaller sigma $\sigma_2$ representing the filtered image comprising the finer detail, and one with a larger sigma $\sigma_1$ representing the filtered image comprising the coarser detail. The subtraction image represents a band-pass filter containing only detail pertaining to the pass-band frequency components. By combining a sequence of levels $b'_m \ldots b'_n$, in the example $b'_4$, $b'_3$, and $b'_2$ in example figure, a sequence of difference of Gaussians i.e. a sequence of Laplacian levels of the Laplacian-Gaussian pyramid is taken together, and a reconstruction of the mid-frequency components of the mammographic image is obtained. To allow further processing to take place on an originally sized image, the band-pass filtered image is interpolated a number of times, two in the example, so as to yield the final filtered image f comprising the candidate masses and having a power spectrum devoid of both low-frequency background components substantially larger than the candidate masses and high-frequency noise components substantially smaller than the searched for mass candidates.

It was found that the selection of the lower and higher cut-off levels m resp. n for the band-pass filter need correct selection for optimal performance. Sensitivity of the mass detection increased when the lower cut-off level (hence affecting the amount of lower frequencies that are still retained in the result) is situated more towards the DC frequency, and the higher cut-off level chosen so as to throw away more of the higher frequencies.

Mass Detection as a Spatial Domain Blob Filtering Process

A class of filters that has particular relevance in the context of mammographic mass candidate generation was found to be based on modelling the mammographic lesions as blobs superimposed on the background signal. A blob is defined as a local increase in image density, modelled as circular shaped intensity surface, with central maximum, and slowly decaying in all directions outwards from the centre. The local gradient of a blob anywhere outside the centre is a vector pointing from the centre towards the periphery, and the iso-lines, along which the first order gradient is zero, are ideally arranged in a concentric manner. The drop-off is normally not constant when moving away from the centre. Hence, when describing the intensity surface locally by the Taylor expansion, second order terms also need to be included. In the following the notations and the framework are those as in B. M. ter Haar Romeny, Front-end vision and Multi-scale analysis: multi-scale computer vision theory and applications, written in Mathematica, Kluwer Academic Publishers, Dordrecht, the Netherlands, 2003, incorporated herein by reference. The aforementioned Taylor expansion in truncated form reads:

$$L(\delta x, \delta y) = L(0, 0) + \left(\frac{\partial L}{\partial x}\delta x + \frac{\partial L}{\partial y}\delta y\right) + \frac{1}{2}\left(\frac{\partial^2 L}{\partial x^2}\delta x^2 + \frac{\partial^2 L}{\partial x \partial y}\delta x \delta y + \frac{\partial^2 L}{\partial y^2}\delta y^2\right) + O(\delta x^3, \delta y^3)$$

The derivatives in this approximation are not invariant w.r.t. local image transformations. For example, the derivative to x and the derivative to y are not invariant to rotation. In this context however, particular focus goes to combination of derivatives that are invariant to rigid body transformations. In particular, the gradient magnitude expressed as the following combination of the individual first order derivatives to x and to y $$M = \sqrt{\left(\frac{\partial L}{\partial x}\right)^2 + \left(\frac{\partial L}{\partial y}\right)^2}$$

is invariant to rotation. In view of the use of higher order derivatives, we consider also the coordinate system that is rotated such that the main axes coincide with the normalized gradient direction $$\vec{w} = \frac{1}{M}\left(\frac{\partial L}{\partial x}, \frac{\partial L}{\partial y}\right)$$

and the perpendicular to the gradient direction $$\vec{v} = \frac{1}{M}\left(-\frac{\partial L}{\partial y}, \frac{\partial L}{\partial x}\right).$$

This rotated coordinate system is called the local gauge coordinate system.

The second derivates to x and to y are neither invariant w.r.t. local image transformations, however, the combination $$\nabla^2 = \frac{\partial^2 L}{\partial x^2} + \frac{\partial^2 L}{\partial y^2}$$

which is commonly called the Laplacian $\nabla^2$, is invariant.

Expressed as a combination of gauge derivative terms, the Laplacian becomes $$\nabla^2 = \frac{\partial^2 L}{\partial w^2} + \frac{\partial^2 L}{\partial v^2}$$

The convolution of the image signal with the Laplacian operator behaves as blob detector in that it has centre-surround response, meaning that it enhances the central blob portion pertaining to increased densities and suppresses a circular band pertaining to the background of the blob, as depicted in FIG. 7 (a) contour plot and (b) 3D plot. This operator is rotation and translation invariant; however, the scale must still be selected to achieve optimum detection performance. This will be described next.

The derivatives are computed in a noise-robust manner by using a Gaussian derivative kernel, for example the first and second order horizontal derivatives are computed as $$\frac{\partial}{\partial x}(L(x, y) \otimes G(x, y, \sigma)) \equiv L(x, y) \otimes \left(\frac{\partial}{\partial x}G(x, y, \sigma)\right)$$

$$\frac{\partial}{\partial x^2}(L(x, y) \otimes G(x, y, \sigma)) \equiv L(x, y) \otimes \left(\frac{\partial}{\partial x^2}G(x, y, \sigma)\right)$$

For the two-dimensional Gaussian expressed as $$G(x, y) = \exp\left(-\frac{x^2 + y^2}{2\sigma^2}\right)$$

the Laplacian filter kernel $\nabla^2$ is expressed as $$\nabla^2 = \left(\frac{\partial^2}{\partial x^2} + \frac{\partial^2}{\partial y^2}\right) G(x, y) = \frac{x^2 + y^2 - 2\sigma^2}{\sigma^4} \exp\left(-\frac{x^2 + y^2}{2\sigma^2}\right)$$

In the spatial domain, the separability property of the 2D Gaussian function can be used to achieve a fast computation of the derivatives by means of two successive 1D kernel convolutions.

To account for the property of the Gaussian derivatives that the amplitude is degrading with increasing scale, i.e. increasing σ, normalized derivates are used by measuring the spatial coordinates relative to scale, i.e. instead of using x and y, the dimensionless coordinates x/σ and y/σ are used. The normalized derivatives then are $$\frac{\partial}{\partial (x/\sigma)} = \sigma \frac{\partial}{\partial x}, \frac{\partial}{\partial (y/\sigma)}$$
$$= \sigma \frac{\partial}{\partial y}, \frac{\partial^2}{\partial (x/\sigma)^2}$$
$$= \sigma^2 \frac{\partial}{\partial x^2}$$

and $$\frac{\partial^2}{\partial (y/\sigma)^2} = \sigma^2 \frac{\partial}{\partial y^2},$$

and the normalized Laplacian operator is $\sigma^2 \nabla^2 L$.

The algorithm to detect the blobs according to an embodiment of the present invention is as follows.

Step 1. Computation of a Reduced-resolution Image

Since the gross scale of the image structures we are interested in is neither at the noise level (corresponding to the finest scale resolution) nor in gross anatomic variations (corresponding to the coarsest scale resolution), a reduced-resolution image is derived from the original image. The above-introduced method of pyramidal image decomposition and reconstruction may be used to this purpose. Typically, a fourth level of the Gaussian pyramid is selected (with zero level corresponding to the original image, level one with an image with twice in size reduced number of rows and columns, level four thus representing a 256-fold reduction in total image area).

Step 2. Computation of the Normalized Laplacian

For a range of scales, the normalized Laplacian is computed for the reduced-resolution image. The scales are expressed as the standard deviation for establishing the kernels of the Laplacian. In embodiments of the present invention, the scale space is generated in 21 exponential levels in the range σ=e$^1$ ... σ=e$^{3.1}$ with exponent step size 0.1.

In order to detect light blobs on a darker background, locations in the image that have positive sign of the Laplacian are selected. Conversely when darker blobs need to be selected, locations with negative sign of the Laplacian are selected. When both light and dark blobs are needed, the absolute value of the Laplacian is computed and maxima are computed in the absolute value image.

Step 3. Maxima of Laplacian in the Image Domain

The Laplacian filter value can be considered a measure of the blob strength in a point; thereby the maxima of the Laplacian in the spatial domain define the blobs.

The spatial maxima are selected by a local maximum operator that uses an eight-connected neighborhood, and these are input to the subsequent step.

Step 4. Maxima of Laplacian in Scale-space

The previous step depends on choosing the appropriate scale. For a given scale, the blob-like features are detected in an image as the spatial local maxima of the feature detector. When the same feature is detected for all levels in a scale-space, the feature can be tracked on the associated sequence of consecutive scales. However, among these levels, there is one level that yields maximum response of the normalized feature detector. This level and the associated refined position of the blob can be found by tracking the maxima of the base level in the scale direction and selecting the position in the level that has maximum response. The detected blobs can then be visualized in the original image by circles with circle center at the position of the detected maxima in scale space and radius of the circle proportional to the detection scale. This circular region can be considered to be a rough segmentation of the candidate mass. This process is depicted graphically in FIG. 8.

A pre-determined number of positions of the detected blobs are then retained for further processing as mass candidates, in particular by producing a more accurate segmentation of the outline of the prospective masses.

Mass Detection as a Gabor Filtering Process in the Frequency Domain

Figure 3:
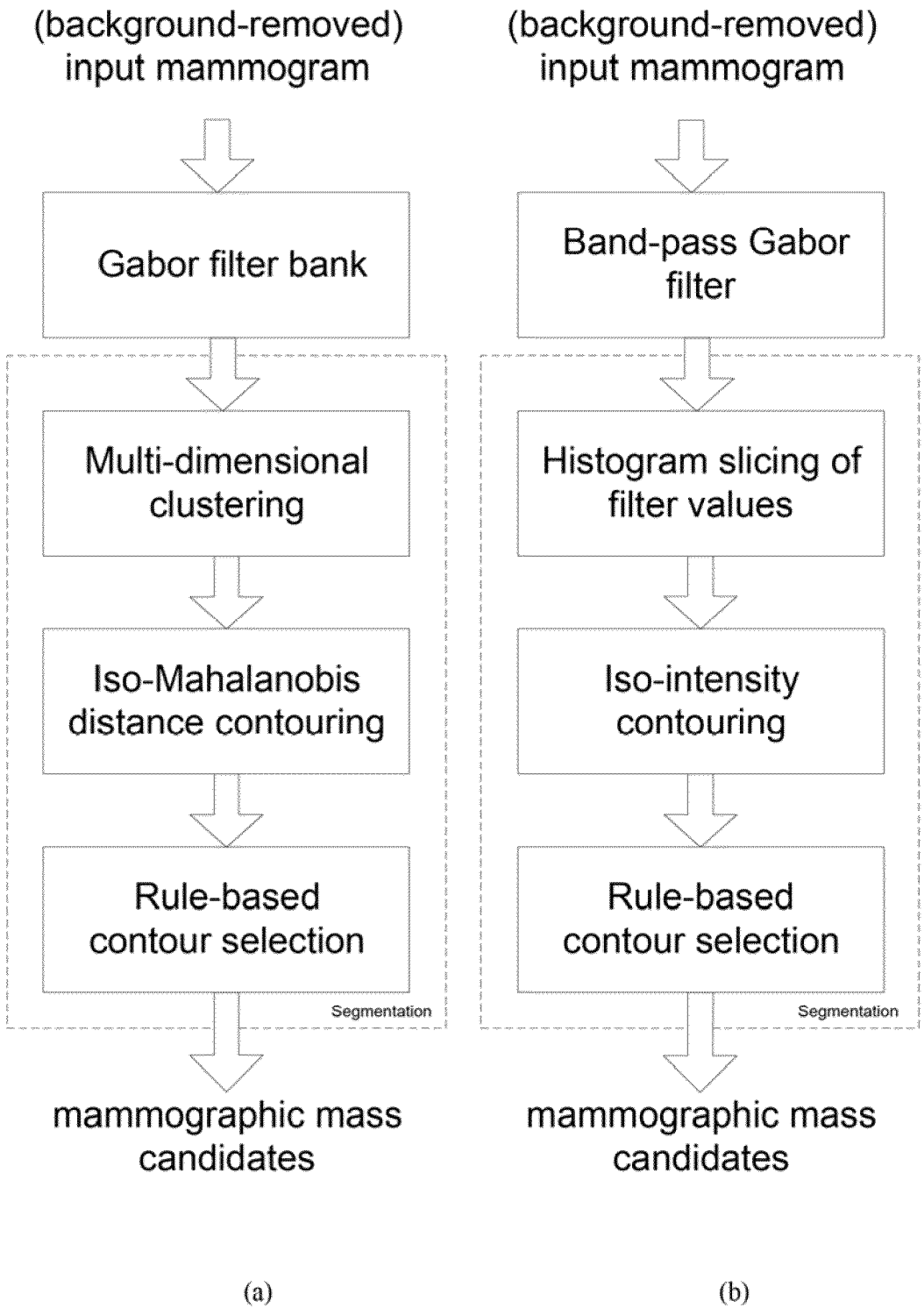
FIG. 3: Block diagram of filtering and segmentation steps to obtain mammographic mass candidates from an input mammographic image or a background-removed mammographic image. A differentiation is made as to whether a filter bank (a) or a single filter (b) is used.

Whereas the blob detection filter addresses the spatial domain content associated with masses, an alternate method to detect mass candidate locations is based on analyzing the frequency domain content associated with masses. Since masses are neither signal variations at low frequencies nor noisy components, filters that direct the mid-high frequency range have been developed and tested. However, since the Fourier domain band pass filters have infinite spatial extent, and masses on the contrary have localized extent, the filters must exhibit good localization in both the spatial and frequency domain. A class of filters that has conceptual characteristics to match these requirements is the Gabor filter. It was found that application of a single carefully designed band-pass filter was also successful in generating the candidate masses, and the resulting transformed image was then subjected to a segmentation process. The rationale of using a Gabor filter bank and the different steps are outlined in the sequel. The block scheme with the main steps is depicted in FIG. 3 (*a*) for the general multidimensional filter bank approach, and FIG. 3 (*b*) for the single filter case:

- (optional) background approximation and removal
- application of a bank of Gabor band-pass filters or in the limiting case a single Gabor filter tuned to detect potential masses
- multidimensional clustering (reducing to histogram slicing in the single filter case)
- iso-contouring of distance to centroid (e.g. Mahalanobis distance) (reducing to iso-intensity contouring in the single filter case)
- mass candidate generation by contour processing The essential characteristics of these steps are now detailed, with reference to FIG. 9 that shows a flowchart of operations involved in applying the Gabor filter bank concept. A typical scenario for mammographic segmentation using this multi-resolution method is shown in FIG. 9. With reference to FIG. 9, the process starts by the input image which could be the original image, the fatless image or any level obtained from the Gaussian pyramid. Then the Gabor filter bank is designed to fill the frequency domain by the Gabor filter bank block (represented by the insert of FIG. 10). Next, the result of applying this filter bank to the original image is a group of filtered images whose number equals the number of the used filters in the bank. The resulting filtered images have real and imaginary parts, which are subsequently subjected to feature extraction methods to obtain the feature images. Different methods were conceived: in the real component method only the real part of the filter image is used, while in the magnitude response, the magnitude of the filtered image is computed using real and imaginary parts. The smoothing method aims to smooth either of the real or magnitude features by a Gaussian filter. After this feature extraction stage, a set of feature images results, that has the property that pixels that belong to the same texture region have the same texture characteristics, and should be close to each other in the feature space (i.e. their response to the Gabor filters will be close to each other). The final step in unsupervised texture segmentation is to cluster the pixels into a number of clusters representing the original texture regions. Labeling each cluster yields the segmented image.

Step 1. Creating the Gabor Filter

A typical Gabor filter-based segmentation in the image processing field uses a filter bank such as the one shown in FIG. 10. The different Gabor filters are distributed among the frequency domain in order to achieve effective multi-resolution analysis.

Since it is not expected that cancer regions would have low frequency components, therefore, in embodiments of the present invention the use of one or more Gabor filters that are carefully designed in order to capture the mid and high frequency information associated with masses is proposed.

The Gabor filter has the proven property that it is capable of providing simultaneous optimal resolution in both the spatial domain and the spatial frequency domain. It is known from Fourier analysis that a point $(u_0, v_0)$ in the Fourier frequency domain corresponds to a sinusoidal oriented plane $h(x, y) = e^{-j2\pi(u_0 x + v_0 y)}$ with infinite extent in the spatial domain.

The Gabor filter limits the extent in the spatial domain by multiplication of the sinusoidal oriented plane with a Gaussian envelope. As the Gaussian drops off rapidly to zero, it can be viewed as a wavelet filter since the kernel has compact support. The Gabor transform acts like the Fourier transform but only for a small Gaussian window over the image, and not the entire image. The typical symmetrical even Gabor filter, the anti-symmetrical odd Gabor filter as well as the band-pass Gabor filter are used in this embodiment of the invention, and are described next.

In terms of functionality, the even and odd Gabor functions in the spatial domain represent a Gaussian modulated sinusoid. They are derived from the complex Gabor function that is specified as $h(x, y) = s(x, y) w_r(x, y)$, i.e. a complex sinusoidal $s(x, y)$ known as the carrier and 2D rotated Gaussian-shaped function $w_r(x, y)$ known as the envelope. For a 2-D Gaussian envelope curve with a spread of $\sigma x$ and $\sigma y$ in the x and y directions and zero rotation, respectively, a modulating sinusoidal $s(x, y)$ of spatial frequency $(u_0, v_0)$, and a phase offset φ that specifies the offset of the filter, the impulse response of the complex Gabor filter is given by:

$$h(x, y) = \frac{1}{2\pi\sigma_x\sigma_y}\exp\left\{-\frac{1}{2}\left[\frac{x^2}{\sigma_x^2} + \frac{y^2}{\sigma_y^2}\right]\right\} \cdot \exp(j(2\pi(u_0 x + v_0 y) + \varphi)$$

The real part and the imaginary part of the complex sinusoidal are respectively $$Re(s(x,y))=\cos(j(2\pi(u_0 x+v_0 y)+\phi)$$

$$Im(s(x,y))=\sin(j(2\pi(u_0 x+v_0 y)+\phi)$$

and the even symmetric and odd anti-symmetric Gabor filter are respectively $$h_e(x, y) = \frac{1}{2\pi\sigma_x\sigma_y}\exp\left\{-\frac{1}{2}\left[\frac{x^2}{\sigma_x^2} + \frac{y^2}{\sigma_y^2}\right]\right\} \cdot \cos(j(2\pi(u_0 x + v_0 y) + \varphi)$$

$$h_0(x, y) = \frac{1}{2\pi\sigma_x\sigma_y}\exp\left\{-\frac{1}{2}\left[\frac{x^2}{\sigma_x^2} + \frac{y^2}{\sigma_y^2}\right]\right\} \cdot \sin(j(2\pi(u_0 x + v_0 y) + \varphi)$$

The parameters $u_0$ and $v_0$ define the spatial frequency components of the sinusoidal in Cartesian coordinates. This spatial frequency can also be expressed in polar coordinates as magnitude $F_0=\sqrt{u_0^2+v_0^2}$ and direction $\omega_0=\arctan(v_0/u_0)$, i.e. $u_0=F_0\cos\omega_0$ and $v_0=F_0\sin\omega_0$. Using this representation, the complex sinusoidal is $$s(x,y)=\exp(j(2\pi F_0(x\cos\omega_0+y\sin\omega_0)+\phi)$$

The envelope part of the Gabor filter is given by $$w_r(x, y) = \frac{1}{2\pi\sigma_x\sigma_y}\exp\left\{-\frac{1}{2}\left[\frac{x_r^2}{\sigma_x^2} + \frac{y_r^2}{\sigma_y^2}\right]\right\}$$

where $(x_r, y_r)$ stand for the spatial coordinates rotated clockwise over an angle θ, i.e. $x=x\cos\theta+y\sin\theta$ and $y=-x\sin\theta+y\cos\theta$. In practice, 2D filters with arbitrary orientation are constructed from rotating an impulse response $h(x, y)$ that is first aligned with the x-axis and next rotated over an angle θ.

The even and odd Gabor filters compute the local contribution of frequency $F_0=\sqrt{u_0^2+v_0^2}$ in the direction $\omega_0$, at scale $\sigma_x$ in the x direction and $\sigma_y$ in the y direction. In the context of embodiments of the present invention, there is made no distinction between scale in x and y direction, i.e. $\sigma_x=\sigma_y=\sigma$. For σ large compared to $1/F_0$, i.e. the envelope will encompass several periods of the modulating carrier, even filters approximate the 2nd derivative, and odd filters approximate the 1st derivative of the image.

In the frequency domain (u, v), the even symmetric Gabor filter becomes two shifted Gaussians at the location of the modulating frequency. The equation of the 2-D frequency response of the filter with zero phase offset that is aligned with the x-axis (i.e. $v_0=0$) is given by:

$$H(u,v)=A\exp\{-2\pi^2[\sigma_x^2(u-u_0)^2+\sigma_y^2 v^2]\}+\exp\{-2\pi^2[\sigma_x^2(u+u_0)^2+\sigma_y^2 v^2]\}$$

where the equalities $$\sigma_u = \frac{1}{2\pi\sigma_x}, \sigma_v = \frac{1}{2\pi\sigma_y},$$

Figure 18:
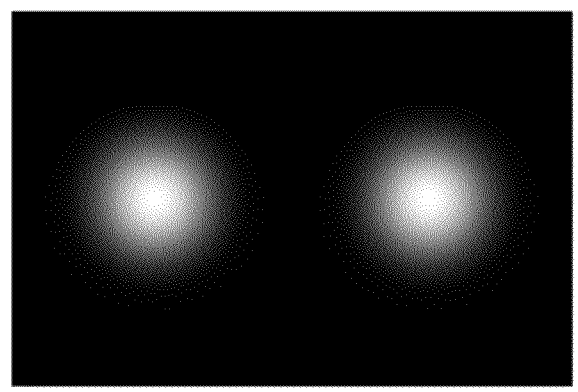

$A=2\pi\sigma_x\sigma_y$, $F_0=u_0$ have been used. The frequency response of the filter is shown in FIG. 18. This filter had shown excellent sensitivity in the task of detecting candidate masses.

A filter that has shown also excellent performance as determined by experiment was based on the complex Gabor filter, represented in the spatial frequency domain by only one Gaussian located at the centre ($u_0$, $v_0$). In contrast to the symmetric even filter, only one lobe is present in the (u, v) plane. Non-centred single lobes did not show to possess any useful detection capabilities because they clearly lacked consistent inclusion or exclusion of lower frequencies. The frequency response of this complex Gabor filter centered at the origin is shown in FIG. 16.

Figure 17:
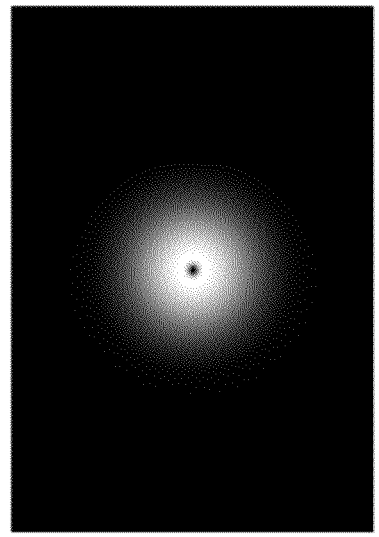

Finally, based on the complex Gabor filter, a band pass Gabor filter was also designed in the context of the present application. This filter selects only the mid frequencies and omits the very small frequencies around (u, v)=(0, 0). It was constructed by a complex Gabor filter with smaller pass-band subtracted from a second complex Gabor filter with larger pass-band. The resulting filter exhibits a hole around (u, v)=(0, 0) and basically compares to the band-pass filter that was constructed on the basis of reconstruction of a contiguous sequence of Laplacian levels introduced above in the framework of the Laplacian-Gaussian pyramidal decomposition. The frequency response of the band-pass Gabor filter is represented in FIG. 17. The amount of low-frequency components that are discarded in the filter result can be controlled by the width of the smaller pass band.

The selection of $\sigma_x$, $\sigma_y$ in the Gabor filters determines the resolution in both the spatial domain and the spatial frequency domain. Low values of $\sigma_x$, $\sigma_y$ lead to better spatial resolution while high values favour frequency resolution. Usually on segmenting an image, short spatial intervals are favourable in order to be able to approximate the boundary between different textures, e.g. the mass and its mammographic background. However, smaller frequency bandwidths are preferable in order to facilitate the discrimination of tissue texture. Unfortunately, the spatial extent and the spatial frequency bandwidths are inversely proportional. These conflicting goals of simultaneous spatial and frequency resolutions are referred to as the uncertainty principle. The Gabor function has an interesting property, which is the optimal joint resolution in both the spatial and the spatial frequency domains; this property is summarized as follows:

If Δx represents the resolution in the spatial domain and Δu represents the resolution in the spatial frequency domain then the joint resolution is bound by the inequality:

$$(\Delta x)(\Delta u) \geq \frac{1}{4\pi}$$

The one-dimensional Gabor function achieves the equality of this formula.

Moreover, the position ($u_0$, φ) in the case of the even symmetric Gabor filters (aligned with the x-axis) in the frequency domain is supposed to be carefully set up to capture essential texture discrimination information. This is an important issue because centre frequencies of channel filters must agree very closely with the emergent texture frequencies in the image.

Selecting a large bank of such Gabor filters will result in a uniform coverage of the spatial frequency domain in an orthogonal manner, meaning that there is almost no overlap between the filters in the frequency domain and each channel extracts different information from the original image. From this multi-channel decomposition, a subset may be selected, and the other channels may be discarded when they convey no information of interest. With respect to the mass candidate selection problem, masses can be seen as more or less circular symmetric structures embedded in the mammographic background, requiring a subset of channels confined to their associated frequency band in the (u, v) plane. Hence, a few number of channels may suffice to reconstruct the mass with small error.

The filter results are sensitive to selecting the filter parameters that are set in embodiment of the invention using an ad-hoc method that optimizes the matching between the pathologically identified regions and the Gabor filter segmented regions. These filter parameters are as follows with respect to the formula of the frequency response of the even symmetric Gabor filter:

The filter frequency $F=F_0$ is set to match the scale of the candidate masses, and was selected in the mid-frequency range. For an image with width N pixels, with N a power of 2, the following values of the spatial frequency $u_0$ are available for selection:

$\sqrt{2}, 2\sqrt{2}, 4\sqrt{2}, \ldots, (N/4)\sqrt{2}$ in cycles/image width

The maximum permitted value $$F = \frac{N}{4}\sqrt{2}$$

allows the pass-band with the highest frequency still to be fully contained in the frequency plane. The frequency bandwidth $B_F$ is defined as the ratio of two successive frequencies $F_1$ and $F_2$, or expressed in octaves as $B_F = \log_2 (F_2/F_1)$ This bandwidth for the given sequence of frequency values is equal to one octave. The lowest frequencies according the lowest number of cycles per image width can be left out of consideration as they represent slowly varying background variations; similarly the highest frequency filter outputs can similarly be omitted as they represent the smallest scale detail not attributable to candidate masses.

The variable $\sigma_y$ is set equal to the variable $\sigma_x$ in order to obtain a circular (isotropic) Gaussian which has a constant spatial extent in all directions. The relationship between the spatial extent $\sigma_x$, $\sigma_y$, the frequency F and the bandwidth $B_F$ of the Gabor filter is given by $$\sigma_x = \sigma_y = \frac{\sqrt{\ln 2} \, (2^{B_F} + 1)}{\sqrt{2} \, \pi F (2^{B_F} - 1)}$$

When $B_F$ is set to 1 octave, these equalities reduce to $$\sigma_x = \sigma_y = \frac{3\sqrt{\ln 2}}{\sqrt{2} \, \pi F}.$$

The motivation for using the isotropic case comes from the fact that the 2D Gaussian and Gabor filter become separable in the x and y direction and can be written and implemented as the tensor product of vertical and horizontal 1D filters.

Hence, in this specific embodiment, the even symmetric Gabor filter, the complex Gabor filter and two versions of the band-pass Gabor filter were tailored to fit the mammogram image segmentation and mass candidate generation problem. The frequency response of the complex, the band-pass and the even symmetric Gabor filter as constructed and applied in this embodiment are shown in FIGS. 16, 17 and 18 respectively. 3D plots of the even symmetric Gabor filter in the spatial domain and the spatial-frequency domain are shown in FIGS. 11 (*a*) and (*b*). Cross sections through the even symmetric Gabor frequency response are depicted in FIG. 26. Cross sections of a wide-hole and narrow-hole band pass Gabor frequency response are depicted in FIG. 27 and FIG. 28 respectively.

Step 2. Applying the Gabor Filters

Because of the large number of coefficients of each of the impulse responses in the spatial domain of the individual Gabor filters that constitute the filter bank, convolution in the spatial domain may be time consuming, even when applying one filter. Therefore, the filtering process is carried out in the frequency domain by the following sub-steps The image z(x, y) is first forward transformed in the frequency domain yielding the Fourier image Z(u, v) consisting of a real and imaginary component A(u, v) resp. B(u, v): Z(u, v)=A(u, v)+jB(u, v)

The filter is then applied by multiplication in the frequency domain with the transfer function H(u, v) to yield the filtered Fourier image Z'(u, v) with real and imaginary components A'(u, v) resp. B'(u, v):

$$Z'(u,v)=H(u,v)Z(u,v)=A'(u,v)+jB'(u,v)$$

The resulting Fourier image is finally transformed back to the spatial domain to yield the filtered image z'(x, y). The FFT (Fast Fourier Transform) for arbitrarily dimensioned images is used to speed up the operations of forward and backward transformation.

An optional step of Gaussian smoothing may further be applied in order to obtain smoother boundaries of the candidate masses, as will be apparent from the next steps. The variance of the Gaussian filter kernel is approximately similar to the Gabor filter kernel's variance.

This process may be done for all filters of the filter bank to result in a multi-dimensional filtered image. However, the first sub-step consisting of the forward Fourier transform of the input mammogram need only be performed once. This Fourier image is successively multiplied with each transfer function H(u, v) of the filter band and transformed back.

Step 3. Clustering

The filtered images are then clustered according to their filtered values that represent how a region is affected by the Gabor filters. In the case of a multi-dimensional vector, the clustering amounts to grouping pixels with a Mahalanobis distance to the mean smaller than a preset value. Graphically, this process can be depicted in the image by iso-lines of Mahalanobis distance. This approach can be simplified by using the Euclidean distance measure.

The K-means clustering that was adopted typically starts by assigning the cluster centres to random points in the input set. Then it starts calculating the distance from each point to its nearest cluster centre—based on the Euclidean distance—the next step is to recalculate the cluster centres as the mean of each cluster. The algorithm works iteratively by assigning the points to their nearest cluster centre, updating the cluster centres until it converges and no more changes can be made. When clustering is done, each pixel is labelled with its respective cluster, finally producing the segmented image.

Each of the feature image's pixels has a feature vector that is composed of the pixel's response to each of the Gabor filters in the filter bank (24 features if using 24 filters). The clustering is then based on the fact that pixels that are in the same cluster are expected to have similar responses to the same filter, and the pixels are clustered in the feature space depending on their feature vector (the smoothed magnitude feature image value resulting from each filter).

When only one filter is used, the clustering can visually be performed by tracing contours of iso-filtered value in the image. The feature image in this case will for example consist of the smoothed magnitude of one Gabor filter response. The pixel values of feature image are clustered to almost 7 bins (index 0 . . . 7). The pixels that are connected and fall within one bin are outlined by one contour or iso-line. In general, different contours will be found in the image whose pixel values fall in the same bin (therefore labelled by the same label, or equivalently have the same frequency of occurrence in the image). The contours for all bins are produced in a similar manner and are superimposed on the original image. This process normally results in lots of regions in the image. Sample images with all the obtained contours using the even symmetric version are shown in FIG. 12-*a*, FIG. 13-*a*, FIG. 14-*a*.

Step 4. Automatic Contour Selection

The previous step results in a contour map of the filtered image that shows a concentration of concentric contours for the prospective masses and many other irregularly shaped contours for the remaining mammographic detail. It was found out that the regions inside the contours and that were annotated by the radiologist, as proven malignant masses, have some features in common and which are successively applied as a set of rules to prune the contour map. These features are:

The minimum frequency level and maximum frequency level of occurrence of this data set are used as a threshold value to discard all regions with frequency levels outside this minimum-maximum range.

The minimum contour length and maximum contour length of this data set are used as a threshold value to discard all regions whose contour length falls outside this minimum-maximum range.

The grey level value at the centre of each contour is greater than a certain value.

The inner contour from a concentric pair is removed; this rule may be applied successively so as to retain the outermost contour from a set associated with a candidate mammographic mass.

The contours which satisfy these selection properties are included in the selection algorithm. Results are shown in FIG. 12-*b,c*, FIG. 13-*b,c*, and FIG. 14-*b,c*.

The resulting contours are concentric as is apparent from these figures. Mammographic masses can be regarded as tapering densities, meaning that each cluster of concentric contours is pointing to the same tissue. This is the underlying rationale for removing the inner contour for a pair of concentric contours. This process is repeated for the set of contours, starting the removal process from the smaller contours. The results of this elimination process is shown in FIG. 12-*d*, FIG. 13-*d*, and FIG. 14-*d* and the final remaining contours are segmenting the mass candidates, to be subjected to further analysis.

It will be clear that the segmentation subpart consisting of the clustering and contour processing step can be applied independently in conjunction with other filtering methods than the Gabor filter bank approach of this section. In particular it may be combined with the methods outlined earlier that address the background mammographic content. For example it may be applied to the residual detail image after reconstruction of the finest detail levels of the Laplacian-Gaussian pyramidal decomposition; or it may be applied to the fat-corrected image that was primarily obtained by a recursive local minimum filtering operation.

Figure 19:
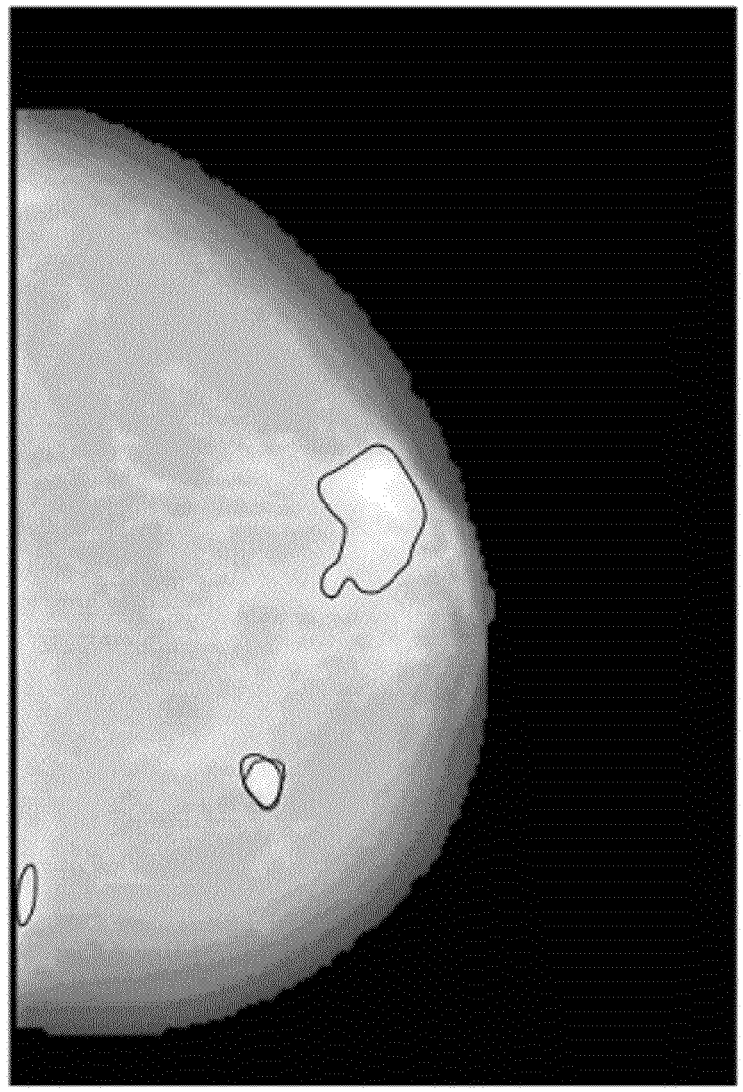

Segmentation results on the sample images of FIGS. 12, 13 and 14 using these stages with a complex Gabor filter are shown in FIGS. 19, 20 and 21 respectively; for the narrow-hole band-pass Gabor filter case, results are shown in FIGS. 22, 23, and 24 respectively. As can be noted from these figures, the delineated candidate masses contain the searched for true masses as indicated by the expert mammogram reader, and furthermore, and their segmentations coincide well with the manual delineations of the expert mammogram reader.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of detecting candidate masses in a mammographic image, comprising:
   subjecting the mammographic signal representing said image to a cascaded filtering process, wherein the cascaded filtering process comprises: 1) background removal filtering for removing a globally varying component in said mammographic image which is based on a physical model of breast composition and/or breast compression and includes a minimum tracking filter from thorax side to mammographic skin line side in which minimum filter values of the minimum tracking filter spread out in a radial way until the breast skin line is reached, and 2) foreground candidate mass filtering, and
   subjecting a result of said cascaded filtering to segmentation.

2. A method according to claim 1 comprising foreground candidate mass filtering by applying at least one even symmetric Gabor filter or at least one bandpass Gabor filter.

3. A method according to claim 1 wherein said foreground candidate mass filtering is performed using a Gaussian Laplacian Pyramid image decomposition method.

4. A method according to claim 1 wherein said foreground candidate mass filtering is performed using wavelet image decomposition.

5. A method according to claim 1 comprising foreground candidate mass filtering by a blob detection process at multiple scales.

6. A method according to claim 1 wherein said background represents a fat component of a breast.

7. A method according to claim 1 wherein the foreground candidate mass filtering comprises bandpass filtering.

8. A method according to claim 7 wherein said foreground candidate mass filtering is performed using a Gaussian Laplacian Pyramid image decomposition method.

9. A method according to claim 7 wherein said foreground candidate mass filtering is performed using wavelet image decomposition.

10. A method according to claim 7 comprising segmentation by iso-level contouring of the filtered result and by applying rules to the resulting contour maps.

11. A method according to claim 1 wherein said foreground candidate mass filtering comprises a blob detection process at multiple scales.

12. A method according to claim 11 whereby segmentation of a mass is obtained as the central portion of the blob having a highest convolved filter response among said scales.

13. A method according to claim 11, wherein blobs are local increases in image density, the blobs being modeled as a circular shaped intensity surface including a central maximum and decaying in all directions outwards from the center.

14. A method according to claim 1 wherein said foreground candidate mass filtering comprises at least one even symmetric Gabor filter or at least one bandpass Gabor filter.

15. A method according to claim 14 comprising segmentation by iso-level contouring of the filtered result and by applying rules to the resulting contour maps.

16. A method according to claim 14 using a single Gabor filter.

17. A computer executing a computer program product on a computer-readable medium adapted to detect candidate masses in a mammographic image, program product causes the computer to subject the mammographic signal representing said image to a cascaded filtering process, wherein the cascaded filtering process comprises: 1) background removal filtering for removing a globally varying component in said mammographic image, which is based on a physical model of breast composition and/or breast compression and includes a minimum tracking filter from thorax side to mammographic skin line side in which minimum filter values of the minimum tracking filter spread out in a radial way until the breast skin line is reached, and 2) foreground candidate mass filtering, and subject a result of said cascaded filtering to segmentation.

18. A computer software product for detection of candidate masses in a mammographic image, the product comprising a non-transient computer-readable medium in which program instructions are stored, which instructions, when read by a computer, cause the computer to subject the mammographic signal representing said image to a cascaded filtering process, wherein the cascaded filtering process comprises: 1) background removal filtering for removing a globally varying component in said mammographic image, which is based on a physical model of breast composition and/or breast compression and includes a minimum tracking filter from thorax side to mammographic skin line side in which minimum filter values of the minimum tracking filter spread out in a radial way until the breast skin line is reached, and 2) foreground candidate mass filtering, and subject a result of said cascaded filtering to segmentation.

19. A method of detecting candidate masses in a mammographic image, comprising:

subjecting the mammographic signal representing said image to a cascaded filtering process, wherein the cascaded filtering process comprises background removal filtering for removing a globally varying component in said mammographic image and foreground candidate mass filtering comprising a blob detection process at multiple scales, wherein the blob detection process includes a computation of a reduced resolution image from the mammographic image, computation of a normalized Laplacian, computation of maxima of Laplacian in an image domain, and computation of a maxima of a Laplacian in a scale-space, and subjecting a result of said cascaded filtering to segmentation.

20. A method of detecting candidate masses in a mammographic image, comprising:

subjecting the mammographic signal representing said image to a cascaded filtering process, wherein the cascaded filtering process comprises background removal filtering for removing a globally varying component in said mammographic image, wherein said background removal filtering is based on a physical model of breast composition and/or breast compression and comprises a minimum tracking filter from thorax side to mammographic skin line side in which minimum filter values of the minimum tracking filter spread out in a radial way until the breast skin line is reached; and subjecting a result of said cascaded filtering to segmentation.

* * * * *